(12) United States Patent
Liccione et al.

(10) Patent No.: US 7,426,652 B2
(45) Date of Patent: Sep. 16, 2008

(54) SYSTEM AND METHOD FOR APPLICATION MONITORING AND AUTOMATIC DISASTER RECOVERY FOR HIGH-AVAILABILITY

(75) Inventors: John Liccione, Millerville, MD (US); Kelly M. Jones, Arnold, MD (US)

(73) Assignee: MessageOne, Inc., Austin, TX (US)

( * ) Notice: Subject to any disclaimer, the term of this patent is extended or adjusted under 35 U.S.C. 154(b) by 441 days.

(21) Appl. No.: 10/657,561

(22) Filed: Sep. 9, 2003

(65) Prior Publication Data

US 2004/0158766 A1 Aug. 12, 2004

Related U.S. Application Data

(60) Provisional application No. 60/408,873, filed on Sep. 9, 2002.

(51) Int. Cl.
*G06F 11/00* (2006.01)

(52) U.S. Cl. .......................................................... 714/3

(58) Field of Classification Search ..................... 714/6, 714/3
See application file for complete search history.

(56) References Cited

U.S. PATENT DOCUMENTS

| | | | |
|---|---|---|---|
| 5,005,122 A | | 4/1991 | Griffin et al. |
| 5,608,865 A | * | 3/1997 | Midgely et al. ................. 714/1 |
| 5,644,698 A | | 7/1997 | Cannon |
| 5,920,848 A | | 7/1999 | Schutzer et al. |
| 6,115,743 A | * | 9/2000 | Cowan et al. ............... 709/224 |
| 6,154,787 A | | 11/2000 | Urevig et al. |
| 6,202,169 B1 | * | 3/2001 | Razzaghe-Ashrafi et al. ... 714/6 |
| 6,292,905 B1 | | 9/2001 | Wallach et al. |
| 6,378,129 B1 | * | 4/2002 | Zetts ............................ 725/94 |
| 6,557,036 B1 | | 4/2003 | Kavacheri et al. |
| 6,578,041 B1 | | 6/2003 | Lomet |
| 6,587,970 B1 | * | 7/2003 | Wang et al. .................... 714/47 |
| 6,618,805 B1 | * | 9/2003 | Kampe ........................... 713/1 |
| 6,651,077 B1 | | 11/2003 | East et al. |
| 6,671,724 B1 | | 12/2003 | Pandya et al. |
| 6,820,214 B1 | | 11/2004 | Cabrera et al. |
| 6,851,073 B1 | | 2/2005 | Cabrera et al. |
| 6,857,009 B1 | | 2/2005 | Ferreria et al. |

(Continued)

FOREIGN PATENT DOCUMENTS

WO WO-01/30130 5/2001

(Continued)

*Primary Examiner*—Scott T. Baderman
*Assistant Examiner*—Paul F Contino
(74) *Attorney, Agent, or Firm*—William D. Wiese; DuBois, Bryant & Campbell, LLP

(57) ABSTRACT

Stable and automated recovery of an application executing on a primary computer system by transitioning to a secondary computer system is provided. Intelligent agents installed on a primary client server allow the primary environment to be replicated on a host, secondary environment. This creates continuous availability of applications executing on the primary system via the mirrored host environment. Every transaction on the client environment (e.g., every piece of data) is replicated in real-time on the host environment. A simple mechanism (e.g., a button) is provided to allow access to the secondary environment thereby switching over from the client environment to the host environment in the case of, with respect to the primary environment, a disaster, a need to perform maintenance, system failure and the like.

5 Claims, 16 Drawing Sheets

U.S. PATENT DOCUMENTS

| | | | |
|---|---|---|---|
| 6,920,579 B1 * | 7/2005 | Cramer et al. | 714/4 |
| 6,948,104 B2 | 9/2005 | Herley et al. | |
| 6,957,248 B2 | 10/2005 | Quine et al. | |
| 7,076,687 B2 * | 7/2006 | Fujibayashi et al. | 714/6 |
| 7,213,246 B1 * | 5/2007 | van Rietschote et al. | 718/1 |
| 7,328,260 B1 * | 2/2008 | Muthiyan et al. | 709/224 |
| 2002/0107958 A1 | 8/2002 | Faraldo, II | |
| 2002/0138612 A1 * | 9/2002 | Sekizawa | 709/224 |
| 2003/0005350 A1 * | 1/2003 | Koning et al. | 714/4 |
| 2003/0050984 A1 | 3/2003 | Pickup et al. | |
| 2003/0088659 A1 * | 5/2003 | Susarla et al. | 709/223 |
| 2003/0157947 A1 | 8/2003 | Fiatal et al. | |
| 2003/0236880 A1 * | 12/2003 | Srivastava et al. | 709/224 |
| 2004/0153713 A1 | 8/2004 | Aboel-Nil et al. | |
| 2004/0235503 A1 | 11/2004 | Koponen et al. | |
| 2005/0003807 A1 | 1/2005 | Rosenfelt et al. | |
| 2005/0009502 A1 | 1/2005 | Little et al. | |
| 2005/0102074 A1 | 5/2005 | Kolls | |
| 2005/0120229 A1 | 6/2005 | Lahti | |
| 2008/0034249 A1 * | 2/2008 | Husain et al. | 714/3 |

FOREIGN PATENT DOCUMENTS

WO  WO-01/67261  9/2001

* cited by examiner

SYSTEM AND METHOD FOR APPLICATION MONITORING AND AUTOMATIC DISASTER RECOVERY FOR HIGH-AVAILABILITY This application claims priority from U.S. Provisional Application No. 60/408,873, filed Sep. 9, 2002. The entirety of that provisional application is incorporated herein by reference.

BACKGROUND OF THE INVENTION

1. Field of the Invention

The present invention generally relates to computer system environments, and more particularly to systems, methods and computer program products that provide disaster recovery and fault tolerance for such environments.

2. Related Art

In today's technological climate it is typical for an enterprise (i.e., a business concern, corporation, institution, organization, government agency or the like) to own and operate one or more computer systems (e.g., a collection of servers, desktops, laptops and the like all connected via local area networks (LANs), wide area networks (WANs) and the like). Such computer systems are used by enterprises so that their personnel (i.e., end users) can access not only software applications (e.g., spreadsheet, word processing, accounting and like applications), but also electronic mail ("e-mail"). There can be no doubt that continuous availability of these computer systems is vital to an enterprise's operations.

Oftentimes, one or more of an enterprise's computer systems are not available. These "down-times" can be caused by facility disaster, hardware failures, software application failures, purposeful attacks from virus or simply scheduled (i.e., periodic) maintenance of one or more of the computer system's infrastructure components. From the end users' perspective, however, it doesn't matter what causes down-time. The end users just know that they cannot access their software applications and/or e-mail to conduct business. Therefore, any down-time of an enterprise's computer systems cuts into their personnel's productivity and thus the enterprise's overall productivity (and oftentimes, profitability).

Information Technology (IT) managers or network administrators charged with the responsibility to minimize down-time and maximize up-time of an enterprise's computer systems are thus faced with a challenge to "bomb-proof" such systems. To meet that challenge, today's IT manager or network administrator is faced with a bewildering array of software and hardware piecemeal components that must be stitched together in order to possibly deliver some level of uptime assurance. These resulting solutions are complex, difficult to maintain, and require significant investment.

For example, several software vendors offer remote data replication products for operating systems such as the Microsoft® Windows 2000™ operating system, but these software products do not help an enterprise's system environments stay healthy, and do not necessarily provide for application failure switch-over and switch-back procedures.

Given the above-described problem, what is needed is a system, method and computer program product for distributed application monitoring, and application and end user switch-over control, in order to provide disaster recovery and fault tolerance and to generally limit an enterprise's computer system down-time.

SUMMARY OF THE INVENTION

The present invention meets the above-identified needs by providing a system, method and computer program product for application monitoring, and application and end user switch-over control, in order to provide disaster recovery and fault tolerance (i.e., to respond to any system failures or a need to perform planned maintenance). That is, in an embodiment, the present invention provides automated recovery of an application executing within a computing environment (i.e., a primary server and network) by allowing for the transitioning to a secondary environment (e.g., a geographically dispersed secondary server and network) regardless of whether the primary server is down due to hardware failure, application failure, disaster or for scheduled maintenance.

In an embodiment, the present invention offers an enterprise the ability to assure that their computer system and its associated data will be highly available and will recover extremely rapidly, even in the event of a catastrophic facility outage. The present invention allows a service provider organization or an enterprise to provide an integrated service that eliminates complexity and reduces the cost to IT managers for assuring high availability and disaster recovery. The present invention includes a graphical user interface (e.g., a command console), application-specific monitoring of both a primary and secondary environments, and the ability to fully command and control the replication, failure switch-over and switch-back procedures between the two environments, and automatic end-user redirection between the two environments.

One advantage of the present invention is that it offers an integrated service that combines aspects of systems monitoring and management software. The result is a 24×7 predictive, degenerative, behavior-based monitoring of all IT elements in a computing environment.

Another advantage of the present invention is that the disaster recovery process which conventionally can take, for example, 24 hours or longer, can be condensed into a 15-minute (or less) automated process.

Another advantage of the present invention is that it provides time-series based, root-cause analysis in real time.

Yet another advantage of the present invention is that it provides distributed systems command and control, data replication, and a customer-dedicated secondary computing infrastructure, to deliver comprehensive assurance of software application up-time and data integrity to an enterprise.

Yet another advantage of the present invention is that it wraps both high availability and disaster recovery for software applications into one package, and places control of the entire package in the hands of the enterprise's IT manager, network administrator or other authorized personnel.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
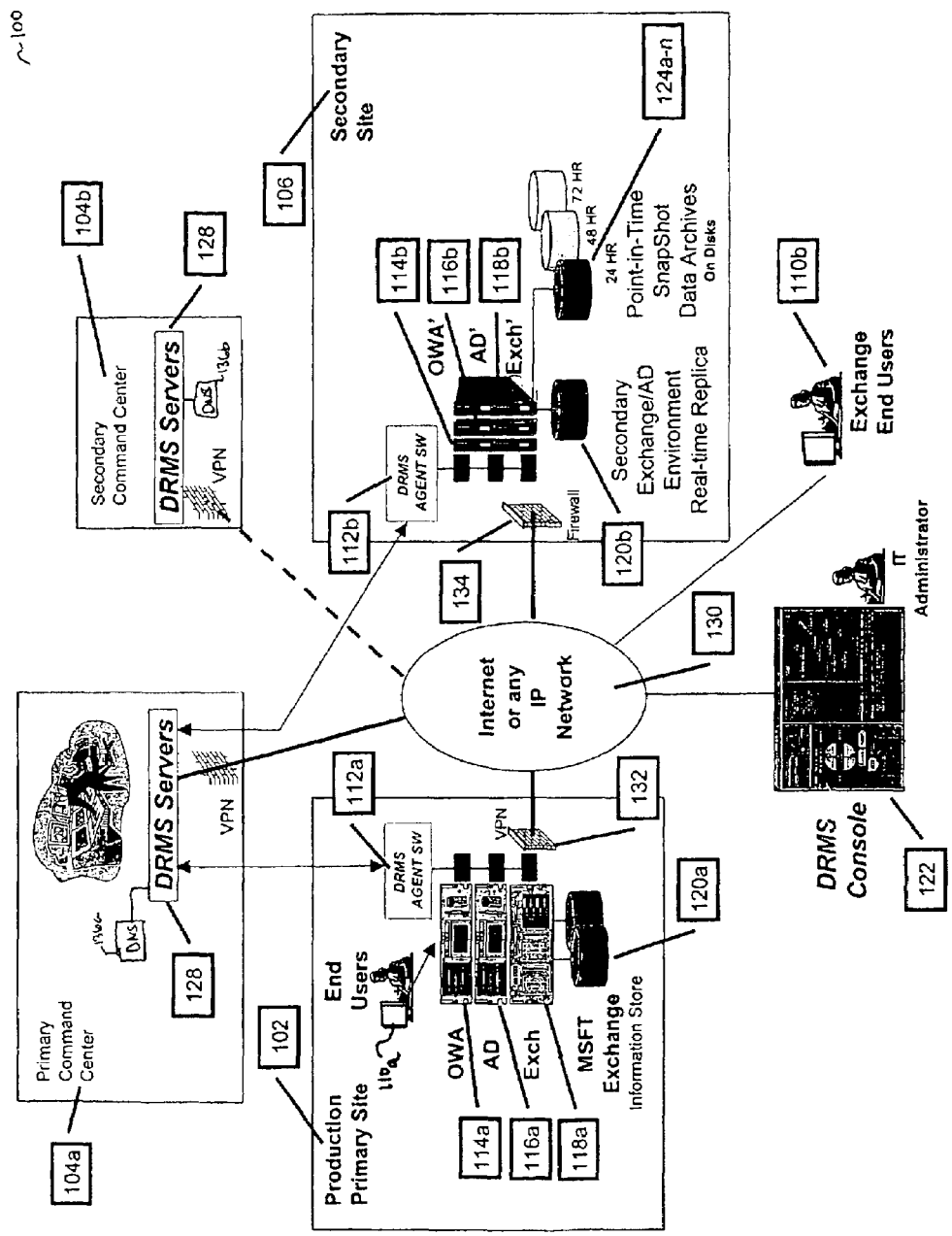
FIG. 1 a block diagram of the system architecture of a monitoring and disaster recovery management system according to an embodiment of the present invention.

The present invention is directed to a system, method and computer program product for application monitoring and control in order to provide disaster recovery, fault tolerance and high-availability for such applications.

In an embodiment of the present invention, a service provider organization or a software company provides and allows access, perhaps on a subscriber fee, pay-per-use or software license basis, to an integrated tool that assures that their customer's computer systems and associated data are highly available and will recover extremely rapidly, even in the event of a catastrophic facility outage. That is, the service provider (or its customers) would provide the hardware (e.g., backup servers) and software (e.g., databases) infrastructure, application software, customer support, and billing mechanism to allow its customers (e.g., enterprises such as for-profit corporations and the like) to access a graphical user interface in order to perform application-specific (e.g., Microsoft® Exchange) monitoring of both a primary and secondary environment, and the ability to fully command and control data replication and failure switch-over and switch-back processes between the two environments for customers' end users.

Further, in such an embodiment, the service provider organization (or its customers) can provide a geographically distributed secondary Microsoft® Exchange environment, with replicated data for fast recovery—whether from disaster, server/network failure or planned maintenance. This would allow the enterprise to achieve 99.99% or greater availability of Exchange to its end-user personnel regardless of the root cause of downtime, and the ability to rapidly restore point-in-time snapshot e-mail archives from disk, and avoid the costs associated with local clustering and off-site back-up tape storage. In such an embodiment, the service provider organization can also provide 24×7 or off-hours Exchange monitoring and response.

The present invention is now described in detail below in terms of the above examples. This is for convenience only and is not intended to limit the application of the present invention. In fact, after reading the following description, it will be apparent to those skilled in the relevant art(s) how to implement the following invention in alternative embodiments (e.g., the monitoring and disaster recovery of different types of software applications and servers besides Microsoft® Exchange). For example, the present invention may be utilized to provide application monitoring, control and disaster recovery for any database-enabled applications.

The terms "user," "entity," "personnel," "enterprise," "operator," "customer," "IT manager," "network administrator" and the plural form of these terms are used interchangeably throughout herein to refer to those who would access, use, be affected by and/or benefit from the tool that the present invention provides for distributed application monitoring and control in order to provide disaster recovery and fault tolerance.

As used herein, "failure switch-over" (or "FO" in the figures) refers to the process of relocating overloaded or failed resource(s) to redundant or backup component(s) or system(s) which are either physically near the primary system, or, more typically, are geographically separated from the primary system.

As used herein, "switch-back" (or "FB" in the figures) refers to the process of restoring resource(s) or service(s) to their primary server(s) after they have been temporarily relocated to a backup system while repairs were implemented on the original host server(s).

II. Physical System Architecture

Referring to FIG. 1, a block diagram illustrating the system architecture of a disaster recovery management (DRM) system 100 according to an embodiment of the present invention is shown. System 100 includes four main components—a customer site 102, a service provider control center 104a, a (redundant) service provider control center 104b, and a secondary environment 106.

In an embodiment, customer site 102 is an enterprise's primary computer network system that includes a plurality of end users (i.e., personnel) 110 (shown as internal end users 110a, and external end users 110b, accessing site 102 via an internal enterprise network or the global, public Internet 130, respectively, in FIG. 1). In alternative embodiments, end users 110 may access customer site 102 using any processing device including, but not limited to, a desktop computer, laptop, palmtop, set-top box, personal digital assistant (PDA) and the like to access e-mail and other applications.

Customer site 102 also includes a Microsoft® Outlook Web Access server 114a, an Active Directory/Domain Name System server 116a and an Exchange server 118a having a data repository (e.g., an Exchange information store) 120a.

Deployed throughout site 102 are a plurality of distributed intelligent agents (IA's) 112a that collect intelligence (i.e., information) from customer site 102 (hardware or software) components. The plurality of intelligent agents 112a are in communications with a monitoring and management server module executing on a management server 128 within site 104a-b. In alternate embodiments, the monitoring and management server module may execute on a server within site 102 or 106.

Secondary environment 106 is a mirrored host environment that replicates the (hardware and software) components of customer site 102. (As will be appreciated by those skilled in the relevant art(s), these mirrored components are shown with the same reference number as those located within customer site 102 but with a "b" designation rather than an "a".) In an alternate embodiment, as will be appreciated by those skilled in the relevant art(s) after reading the description herein, secondary environment 106 need not employ exactly the same hardware and configurations as customer site 102 (i.e., it need not be an exact "mirror site"), as long as the same functionality (i.e., applications) can be provided to end users 110. Secondary environment 106 also includes a plurality of Exchange data archives 124 (shown as data archives 124a-n in FIG. 1) that serve as "multi-level," near-line physical archival storage disks (e.g., 24, 48 and 72 hour levels of archival data). In an embodiment, Exchange data archives 124 are implemented using a Redundant Arrays of Inexpensive Disks (RAID) server.

In an embodiment, secondary environment 106 is geographically dispersed (i.e., not co-located and geographically spread, for example, thirty miles apart) from customer site 102 in order to provide an adequate disaster recovery environment. Further, in an embodiment, secondary environment 106 is connected to primary environment 102 via a wide area network 130 (e.g., the global, public Internet).

In an embodiment, control centers 104a and 104b are mirrored sites for redundancy and includes at least one management server 128a-b, respectively, executing the monitoring and management server module which is in communications with IA's 112a-b, respectively. Control centers 104a-b allow the service provider personnel to monitor site 102 on behalf of a customer. In an embodiment, control centers 104a and 104b each include a Domain Name System (DNS) server 136a and DNS server 136b, respectively.

After reading the description herein, it will be apparent to those skilled in the relevant art(s) that system 100 provides an enterprise (i.e., a customer of the service provider organization) with a dedicated disaster recovery environment geographically dispersed from the enterprise's Exchange and Active Directory infrastructure, and includes Exchange and Active Directory data replication, data archiving, monitoring, and failure switch-over/switch-back command and control between a "primary" Exchange and Active Directory environment and a dedicated "secondary" Exchange and Active Directory environment (e.g., located at the service provider's location or another secondary location).

After reading the description herein, it will also be apparent to those skilled in the relevant art(s) a console 122 provides a graphical user interface (GUI) that serves as a daily interface into the system 100 over Internet 130 and provides the information required to troubleshoot system problems, prevent down-time, and to execute failure switch-over, switch-back and archive restores for the primary Exchange environment (i.e., site 102). In an embodiment, console 122 can also be used by the enterprise's Exchange administrator, IT manager or network administrator within site 102 (or from anywhere via the Internet 130) as a daily interface to DRM system 100.

More detailed descriptions of DRM system 100 components, as well their functionality, are provided below.

III. Operational Overview

Following is an operational overview of DRM system 100 according to an embodiment of the present invention.

The plurality of distributed intelligent agents 112a are deployed to customer site 102 which collect intelligence information on system health. In an embodiment, agents 112a monitor the state (e.g., started, stopped, mounted, dismounted) of Exchange application services such as Simple Mail Transfer Protocol (SMTP), Microsoft System Attendant (MSSA), Microsoft Routing Engine (MSRESVC), Microsoft Information Store (MSIS), Microsoft Message Transport Agent (MTA), Internet Message Access Protocol (IMAP4), and Post Office Protocol (POP3), Internet Information Server (IIS) Admin, and World Wide Web Publishing Service, and the state of the Exchange information stores and storage groups.

Figure 9A:
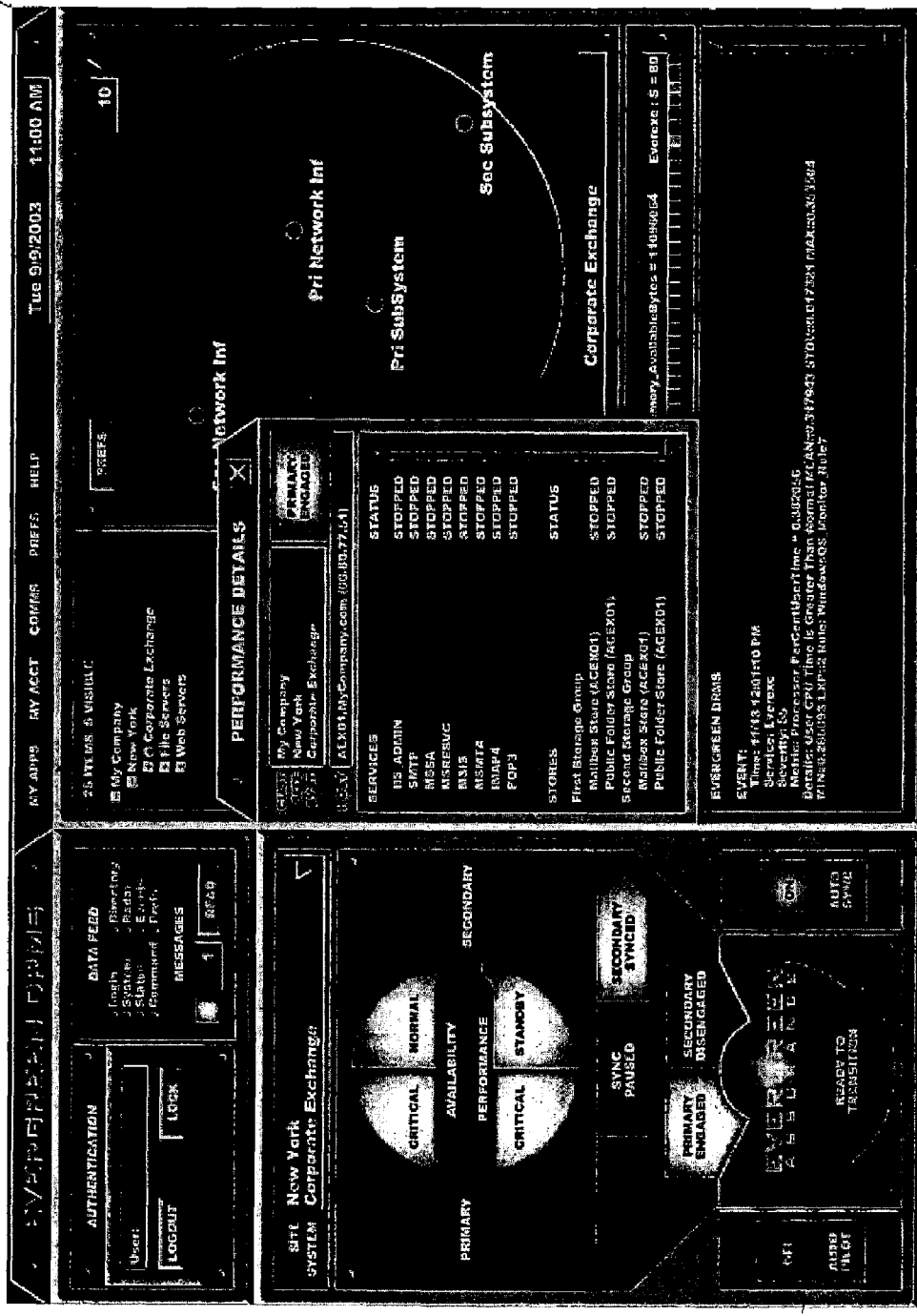
FIGS. 9A-F are exemplary windows or screen shots generated by the graphical user interface of the present invention.
Figure 9B:
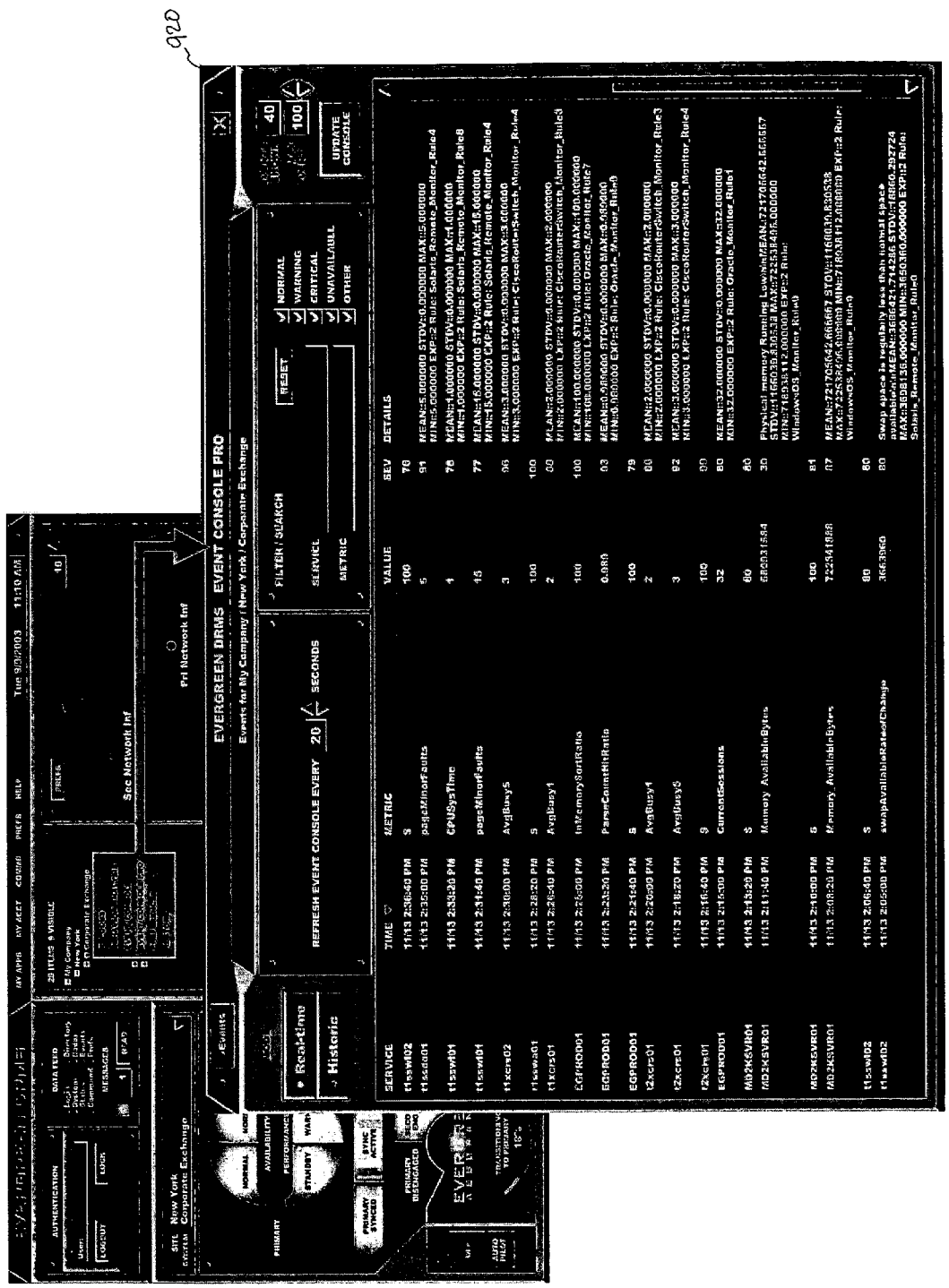

In an embodiment, each of the plurality of distributed intelligent agents 112 are small pieces of code logic that query the operating system and/or applications executing within site 102 or 106 and report state information to monitoring and management server module executing on server 128. FIGS. 9A-B illustrate example GUI screens 910 and 920 (capable of being shown on console 122) which reports various Exchange-related state information from information received and collected from IA's 112.

Figure 9C:
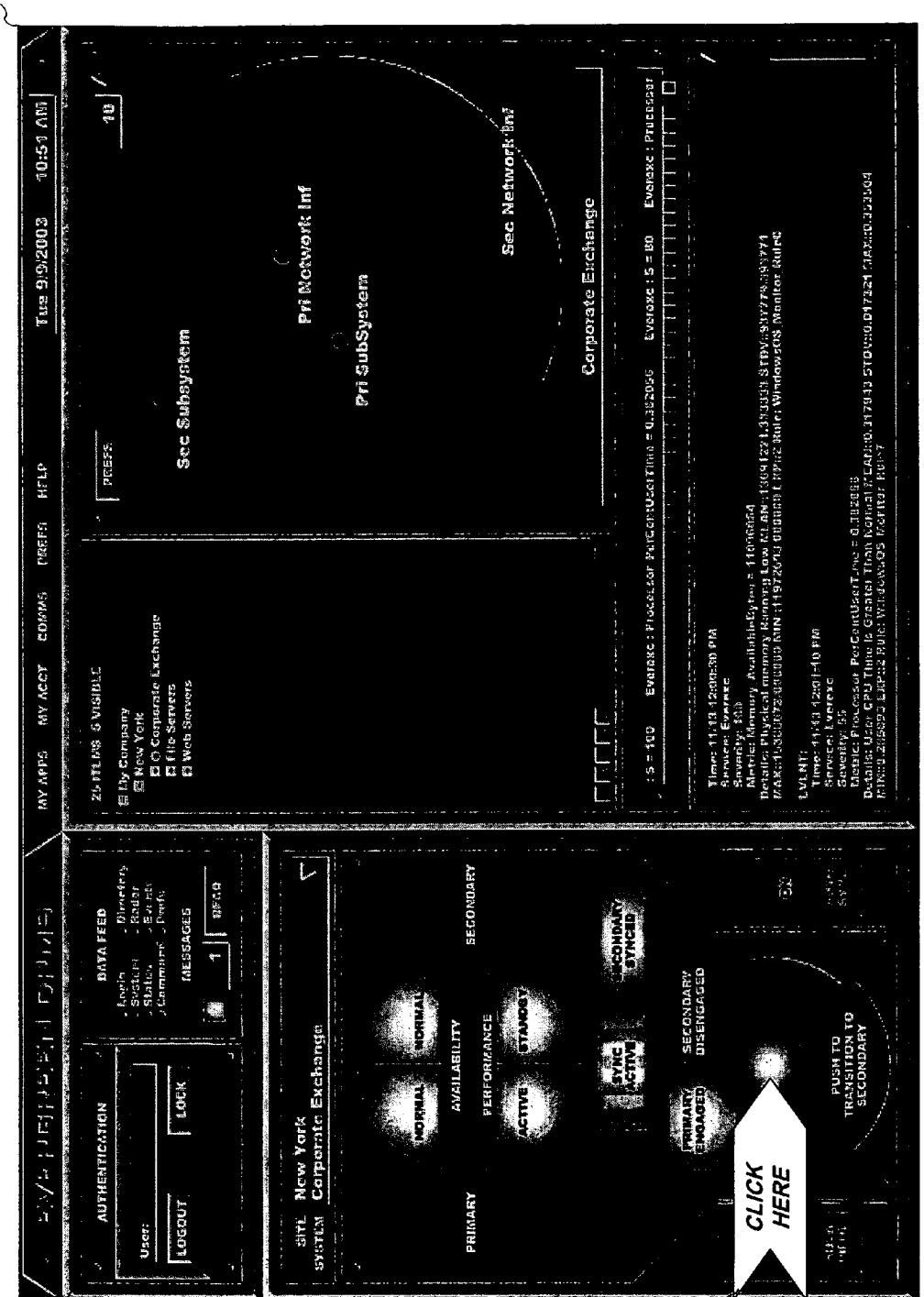
Figure 9D:
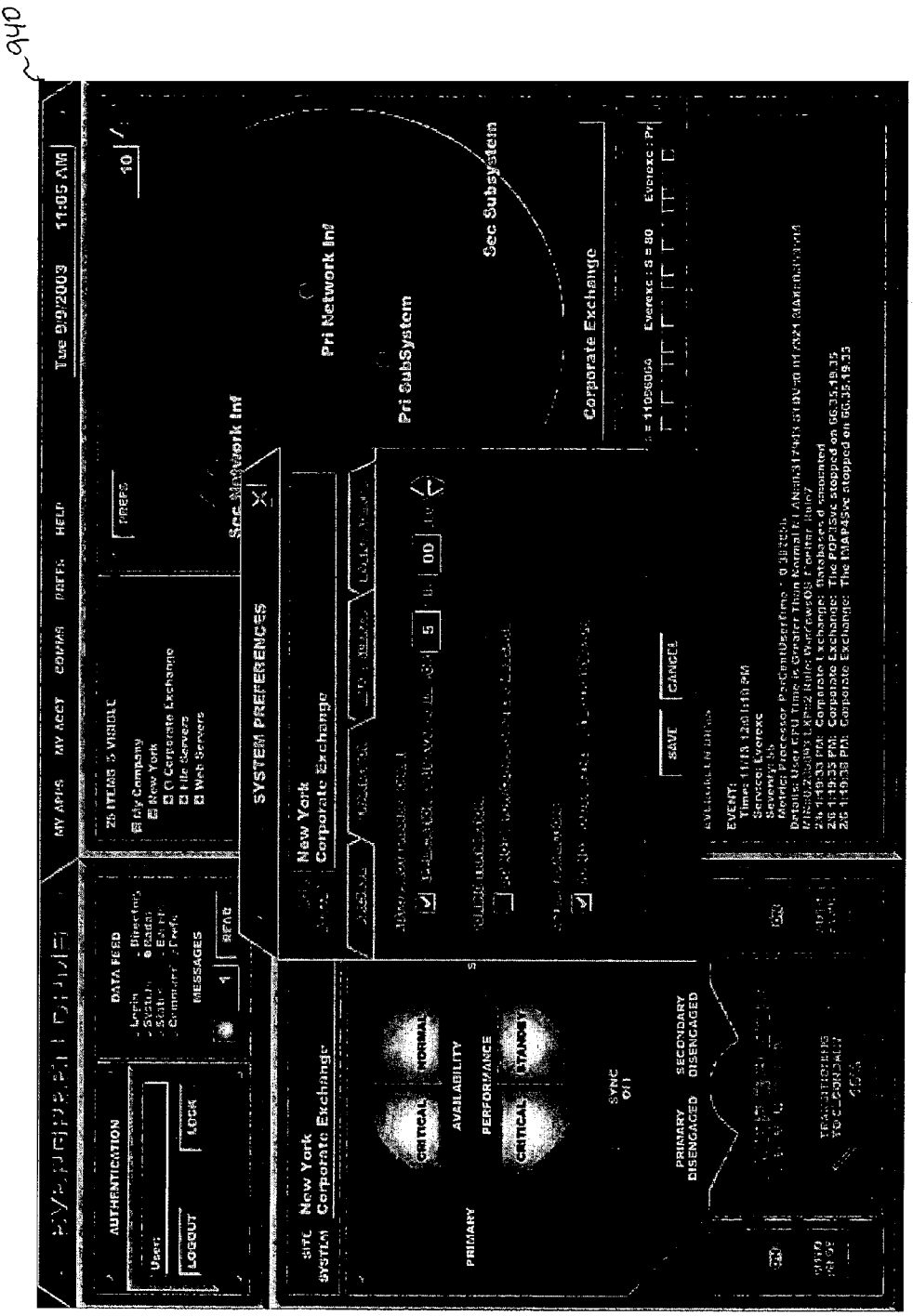
Figure 9E:
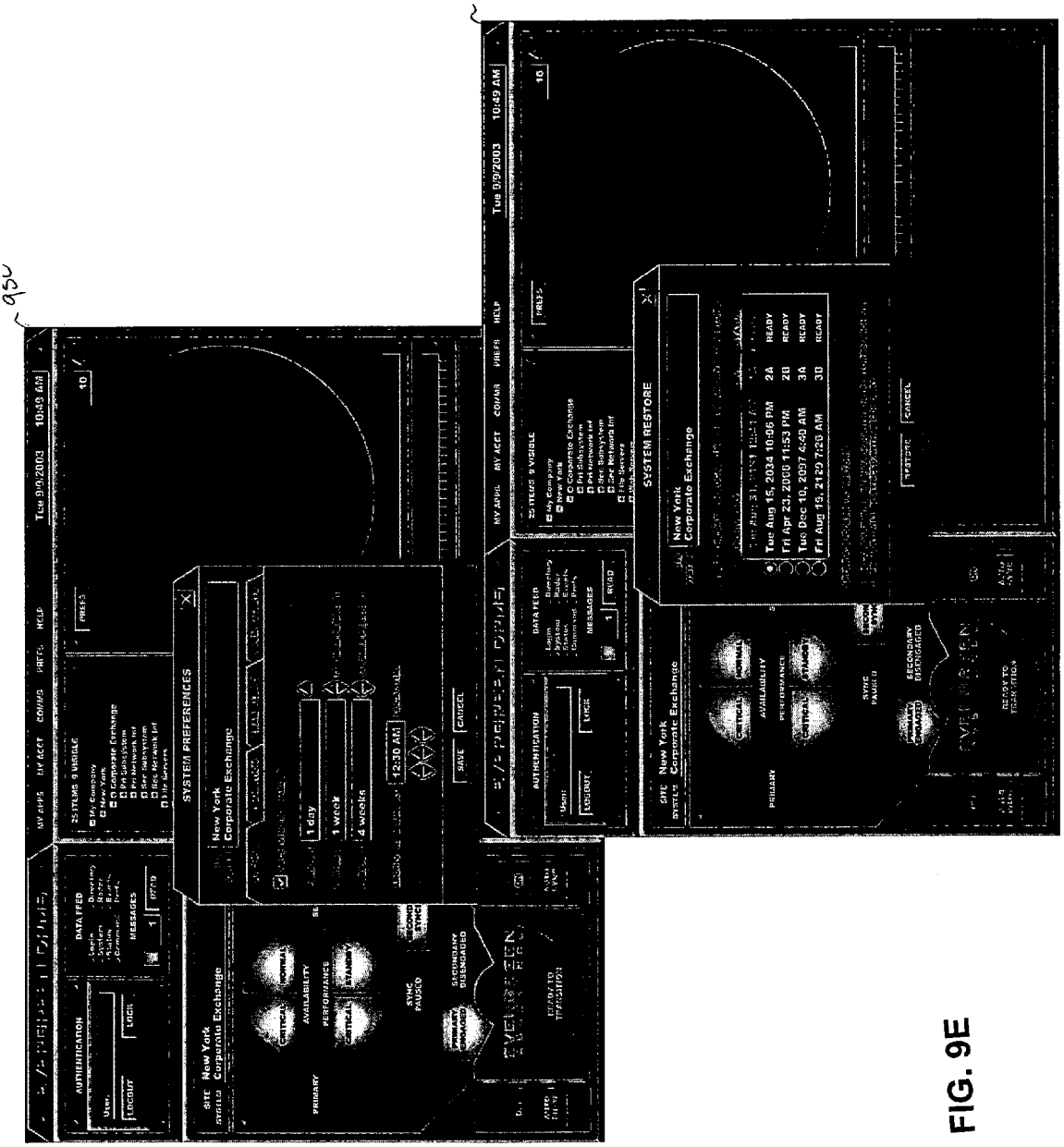
Figure 9F:
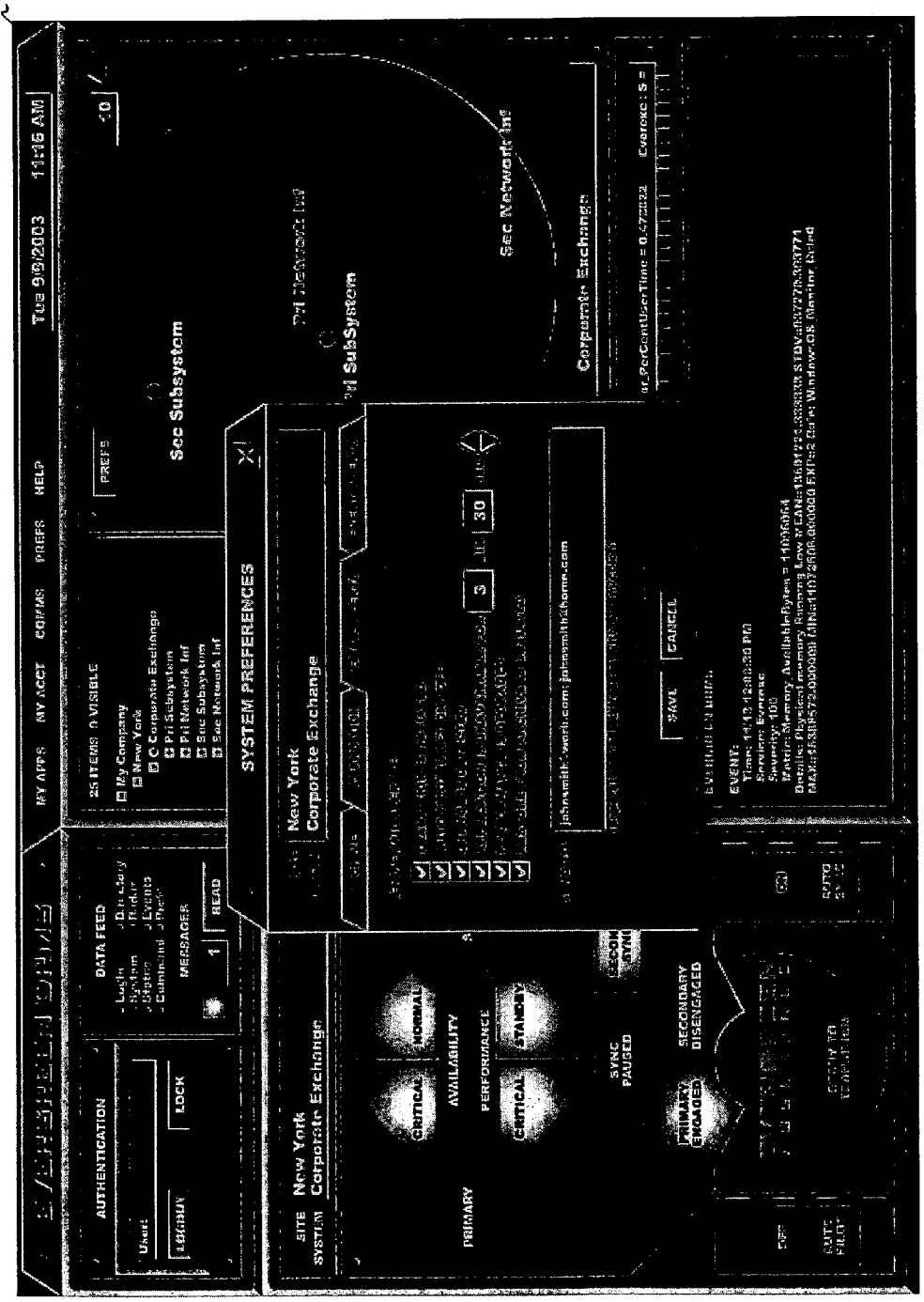

After reading the description herein, it will also be apparent to those skilled in the relevant art(s) that console 122 not only provides the ability to execute failure switch-over and switch-back, but also provides the information required to troubleshoot site 102 and 106 problems and prevent down-time. That is, console 122, using IA's 112 allows automatic change detection of system 100 subsystems and notification (e.g., e-mail alerts) to relevant personnel (e.g., a network administrator). More specifically, through IA's 112, monitoring and management server module executing on a management server 128 and console 122, system 100 monitors for change in the production/primary environments (102 and 106) to ensure changes impacting the recoverability to the secondary environment 106 are detected and the proper personnel are alerted. This is a critical aspect of DRMS system 100 because changes that are made to production (i.e., primary site 102), and not to recovery environment 106, may prevent successful failure switch-over. FIG. 9F illustrates an example GUI screen 960 (capable of being shown on console 122) which allows a user to set system preferences related to such automatic change detection and notification described herein.

In the event of a facilities or site 102 disaster, local failure or scheduled maintenance, an enterprise still needs to communicate in order to continue business operations. Thus, in an embodiment, secondary environment 106, which includes Outlook Web Access server 114b, Active Directory Service/Domain Name System server 116b, Exchange server 118b, storage 124 and firewall 132, is available. System 100 provides the customer's administrator the ability to rapidly engage the secondary Exchange environment 106 in under 15 minutes. Due to this speed, the enterprise can leverage secondary Exchange environment 106 for planned systems maintenance and distributed high-availability, obviating the need for late-night maintenance down-time, expensive and complex local clustering hardware and software, manually intensive processes and procedures, and custom control-software development.

In an embodiment, system 100 replicates the enterprise's Exchange data to the secondary Exchange environment 106 in real-time to ensure no data loss in the event of a failure or disaster at the primary Exchange site 102. In one embodiment, this is accomplished over an encrypted VPN 134 connection across the Internet 130. System 100 gives the administrator control of the data replication process, allowing synchronization in either direction between primary and secondary sites 102 and 106. Normally, system 100 keeps track of distributed system state and determines in which direction to be replicating based on the current system state, automatically.

In an embodiment, three or more levels of point-in-time "snap-shots" (e.g., 24, 48 and 72-hour) of the customer's Exchange information store and related Exchange log information are also captured, copied and stored on disk (i.e., Exchange data archives 124) thus eliminating the need for tape back-up and their associated lengthy restoration times.

Data recovery archive 124 is available to the administrator to facilitate restoration of corrupted or lost data in the event of unintentional deletion or data information store corruption. In an embodiment, system 100 gives the administrator the ability to effectively "fly" over both primary 102 and secondary 106 Exchange environments and monitor and manage both as one integrated system, from one console 122. In such an embodiment, system 100 implements a finite state machine that keeps track of the "state" of the two-site Exchange system (i.e., sites 102 and 106), and gives the administrator an unambiguous indication of the state of the distributed system.

IV. States and State Transitions

Figure 2:
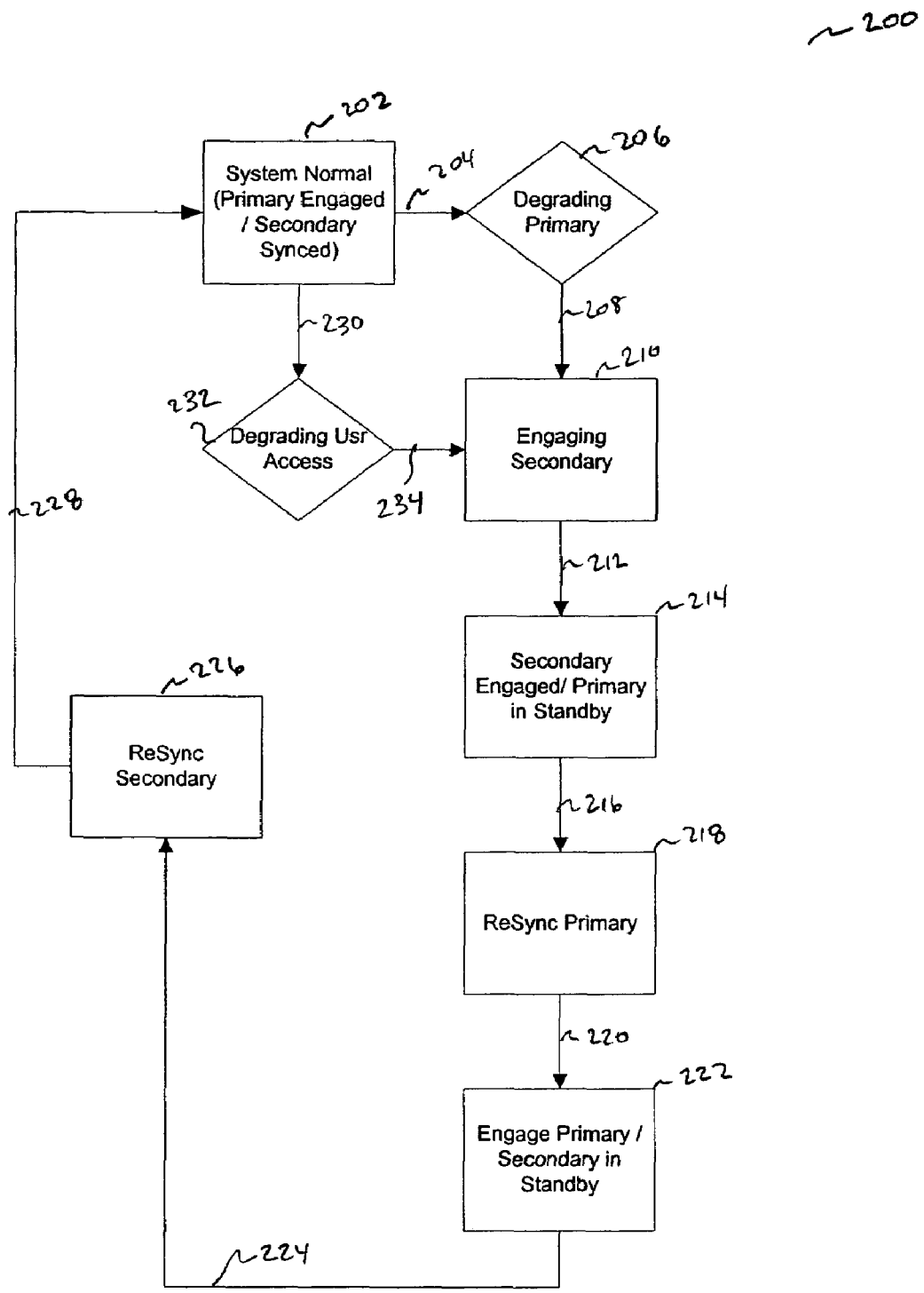
FIG. 2 is a flowchart illustrating an operational flow (i.e., transitions) of a finite state machine implemented by the system of FIG. 1 according to one embodiment.

Referring to FIG. 2, a flowchart illustrating the states and state transition process 200 of a finite state machine according to an embodiment of the present invention is shown. That is, system 100 provides the administrator with command and control capability to effectively control the state of system 100, cross-site replication, and the engagement and disengagement of the primary 102 and secondary 106 Exchange environments. In such an embodiment, system 100 can be in one of the seventeen states and state transitions as shown in FIG. 2 and described below. For each state or transition, the state of the components of system 100, the state of user access and the state of data synchronization is described.

In state 202, system 100 is in its "Normal" state. With respect to the components (or subsystems) of system 100, the status and state of the primary 102 and secondary 106 Exchange environments are monitored. This is accomplished by the distributed intelligent agents 112 which constantly check the health of Exchange environments as well as the operating system that is supporting the Exchange application. In an embodiment, an intelligent agent 112 scans attributes (or metrics) as described above, and the monitoring and management server module executing on server 128 assimilates their relationships, analyzing the latest information and rendering a state indicative of the "health" of the specified (hardware or software) subsystem.

In one embodiment, data is collected from each metric (i.e., from each intelligent agent 112) once every predetermined time period (e.g., every thirty seconds) for analysis. In such an embodiment, all information regarding the state of the subsystems is stored in a repository (e.g., a relational database located on, or accessible by, server 128). In "Normal" state 202, all metrics for all subsystems monitored are operating within observed "Normal" (i.e., pre-defined) parameters for each metric.

In state 202, the state of user access over the network is also monitored. That is, the status and state of the supporting infrastructure required to provide end users 110 access to the subsystems of system 100 are monitored by intelligent agents 112. In one embodiment, intelligent agents 112a continuously check once every predetermined time period (e.g., every thirty seconds) the health of the network devices such as routers and switches within environments 102 and 106. In one embodiment, the monitoring and management server module executing on server 128 accesses end user 110 access points periodically in order to provide a rendering of the state of user accessibility. In one embodiment, all information regarding the state of end user 110 access is stored on server 128. In the "Normal" state, all metrics relating to end user 110 are within observed "Normal" (i.e., pre-defined) parameters.

In state 202, the state of data synchronization is also monitored. In an embodiment, in order to provide failure switch-over capability, system 100 must have the ability to synchronize log and user data between the primary 102 and secondary 106 Exchange environments. In one embodiment, system 100 facilitates synchronization of Exchange-related data between Active Directory servers 116a-b and Exchange information stores 120a-b.

In one embodiment, system 100 (i.e., monitoring and management server module executing on server 128) utilizes the Double-Take® software product available from NSI Software, Inc. of Hoboken, N.J. in order to facilitate such synchronization. In one embodiment, intelligent agents 112a collect and check data synchronization metrics which are then stored in the repository (i.e., the relational database located on, or accessible by, server 128). In "Normal" state 202, data synchronization occurs automatically from primary 102 to secondary 106 environments (i.e., synchronization is ongoing in real time in an ad hoc manner as new data are written to the Exchange logs and stores within site 102).

In an embodiment, system 100 experiences state transition 204 ("Normal" to "Degrading Primary") in the following situations when: one of the subsystem intelligent agents 112a detects a condition or a tendency toward a condition within a primary 102 subsystem that would cause it to determine that it is becoming impaired to the point where end users 110 are affected; one of the user access intelligent agents 112a detects a condition or a tendency toward a condition within the one of the user access points that would cause it to determine that one or all of the user access points is becoming impaired to the point where end users 110 are affected; or data synchronization intelligent agents 112a detects a condition where data synchronization from primary 102 to secondary 106 environments is degraded (although end users 110 may not be affected). After transition 204, system 100 is in state 206 (i.e., "Degrading Primary").

System 100 experiences state transition 208 ("Degrading Primary" to "Engaging Secondary"), in an embodiment, when a user (e.g., network administrator or IT manager) decides to engage the failure switch-over process to switch from primary environment 102 to secondary environment 106 using a single action (e.g., clicking a button or the like) on the GUI on console 122. FIG. 9C illustrates an example GUI screen 930 (capable of being shown on console 122) in which a customer may employ a single action to engage the failure switch-over process to switch from primary environment 102 to secondary environment 106 (e.g., clicking button 932).

In state 210, system 100 ("Engaging Secondary") transitions from primary 102 to secondary 106 environment. That is, in an embodiment, primary environment 102 is transitioned to a quiescent state (i.e., services on primary 102 are taken to an inactive state), while secondary environment 106 is brought to an active state (i.e., servers 114b-118b supporting Exchange and its associated services are brought to an active state). Once secondary environment 106 and Exchange services are active, traffic once destined to the primary 102 are rerouted to secondary environment 106, and data synchronization is reversed to flow from secondary environment 106 to primary environment 102.

In an embodiment, system 100 experiences state transition 212 ("Engaging Secondary Success") when the attempt to transition primary environment 102 to a quiescent state and the attempt to transition secondary environment 106 to an active state succeed. All services within primary environment 102 are then taken to an passive state and servers 114b-118b supporting Exchange and its associated services are brought to an active state within secondary environment 106. Further, traffic is then routed to secondary environment 106 and data synchronization is reversed in direction.

In state 214 ("Secondary Engaged/Primary in Standby"), in an embodiment, primary environment 102 has been successfully transitioned to a quiescent state and the transition of secondary environment 106 to an active state has succeeded. Thus, all services within primary environment 102 are placed in an standby state, servers 114b-118b supporting Exchange and its associated services are brought to an active state, traffic is routed to secondary environment 106 and any data changes in secondary environment 106 are cached in preparation for any primary recovery (i.e., the switch-back process).

In state transition 216 ("Secondary Engaged/Primary in Standby-Success"), in an embodiment, primary environment 102 is maintaining a transitioned quiescent state and secondary environment 106 is in an active state, Thus, all services within primary environment 102 are placed in an standby state, servers 114b-118b supporting Exchange and its associated services are brought to an active state, traffic is routed to secondary environment 106, and any data changes in secondary environment 106 are cached in preparation for any primary recovery (i.e., the switch-back process).

In state 218 ("ReSync Primary"), in an embodiment, system 100 experiences the following in preparation for transition from secondary environment 106 to primary environment 102: primary environment 102 is maintained in a transitioned quiescent state and secondary environment 106 is in an active state; servers 114b-118b supporting Exchange and its associated services are in an active state while servers 114b-118b are in standby state, and traffic is routed to secondary environment 106, any data changes in secondary environment 106 are cached in preparation for any primary recovery (i.e., the switch-back process) but are not sent to primary environment 102.

In state transition 220 ("ReSync Primary-Success"), in an embodiment, system 100 experiences the following in preparation for transition from secondary environment 106 to primary environment 102: primary environment 102 is maintaining a transitioned quiescent state and secondary environment 106 is in an active state; all services within primary environment 102 are placed in an standby state; servers 114b-118b supporting Exchange and its associated services are in an active state; traffic is routed to secondary environment 106, and attempts to copy cached data changes from secondary environment 106 to primary environment 102 have succeeded and new data changes are replicated to primary environment 102 from secondary environment 106 in real time.

In state 222 ("Engaging Primary"), resulting from a customer using a single action (e.g., clicking a button or the like) on the GUI on console 122, in an embodiment, system 100 experiences secondary environment 106 being transitioned to a quiescent state while primary environment 102 is being brought to an active state; all services within primary environment 102 are taken to an active state; and servers 114b-118b supporting Exchange and its associated services are brought to an standby state. Once primary environment 102 has confirmed Exchange services are active, traffic once destined to secondary environment 106 is rerouted to primary environment 102 and data synchronization from primary environment 102 to secondary 106 environments remain in a standby state until overall system integrity of primary environment 102 is later confirmed.

In state transition 224 ("Engaging Primary-Success") system 100 experiences in an embodiment: secondary environment 106 transitions to a quiescent state while primary environment 102 is brought to an active state; all services within primary environment 102 are taken to an active state; servers 114b-118b supporting Exchange and its associated services are brought to an standby state; and traffic once destined to secondary environment 106 is now rerouted to primary environment 102.

In state 226 ("ReSync Secondary"), in an embodiment, all cached data changes have been successfully copied from primary environment 102 to secondary environment 106 and all new data changes are being replicated to secondary environment 106 from primary environment 102 in real time.

In state transition 228 ("To System Normal"), system 100 returns to its "Normal" state as described above with reference to state 202.

In state transition 230 ("Degraded User Access"), system 100 in an embodiment is experiencing its "Normal" state, yet traffic to primary environment 102 is being negatively impacted causing degradation of experience for end users 110. Thus, system 100 transitions to state 232 ("Degraded User Access").

In state 232, a user (e.g., network administrator or IT manager) can decide to engage the failure switch-over process in order to switch from primary 102 to secondary 106 environment using a single action (e.g., clicking a button or the like) on the GUI on console 122, thereby placing system 100 in state 210 (described above) via transition 234.

As will be appreciated by those skilled in the relevant art(s) after reading the description herein, in the event primary environment 102 no longer exists (e.g., due to a disaster), then state transition process 200 can proceed as described above with respect to secondary environment 106, but actions taken with respect to primary environment 102 are bypassed.

V. System Operation: Failure Switch-Over and Switch-Back

Figure 3A:
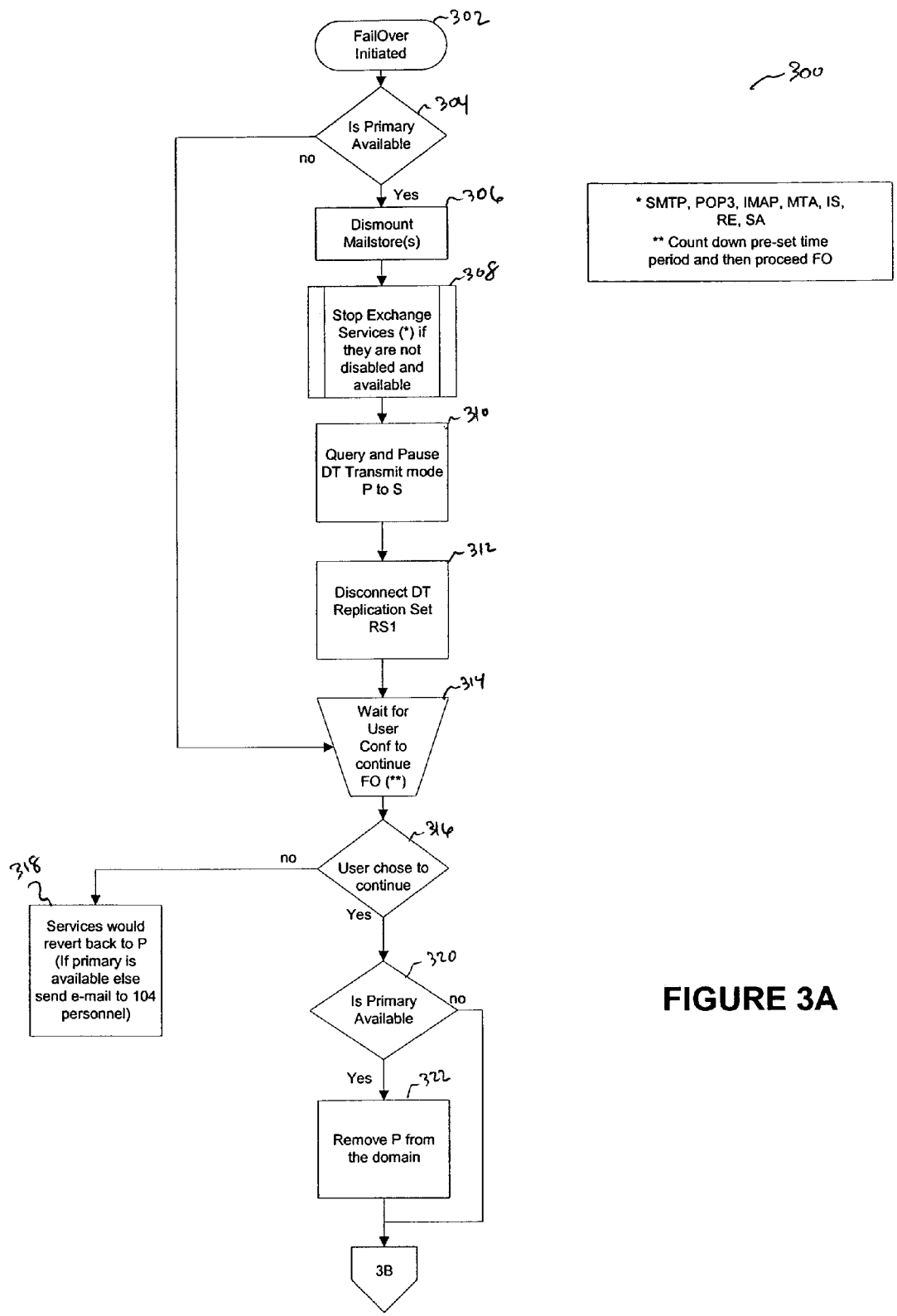
FIGS. 3-7 are flowcharts illustrating the operations of the present invention according to various embodiments.
Figure 3B:
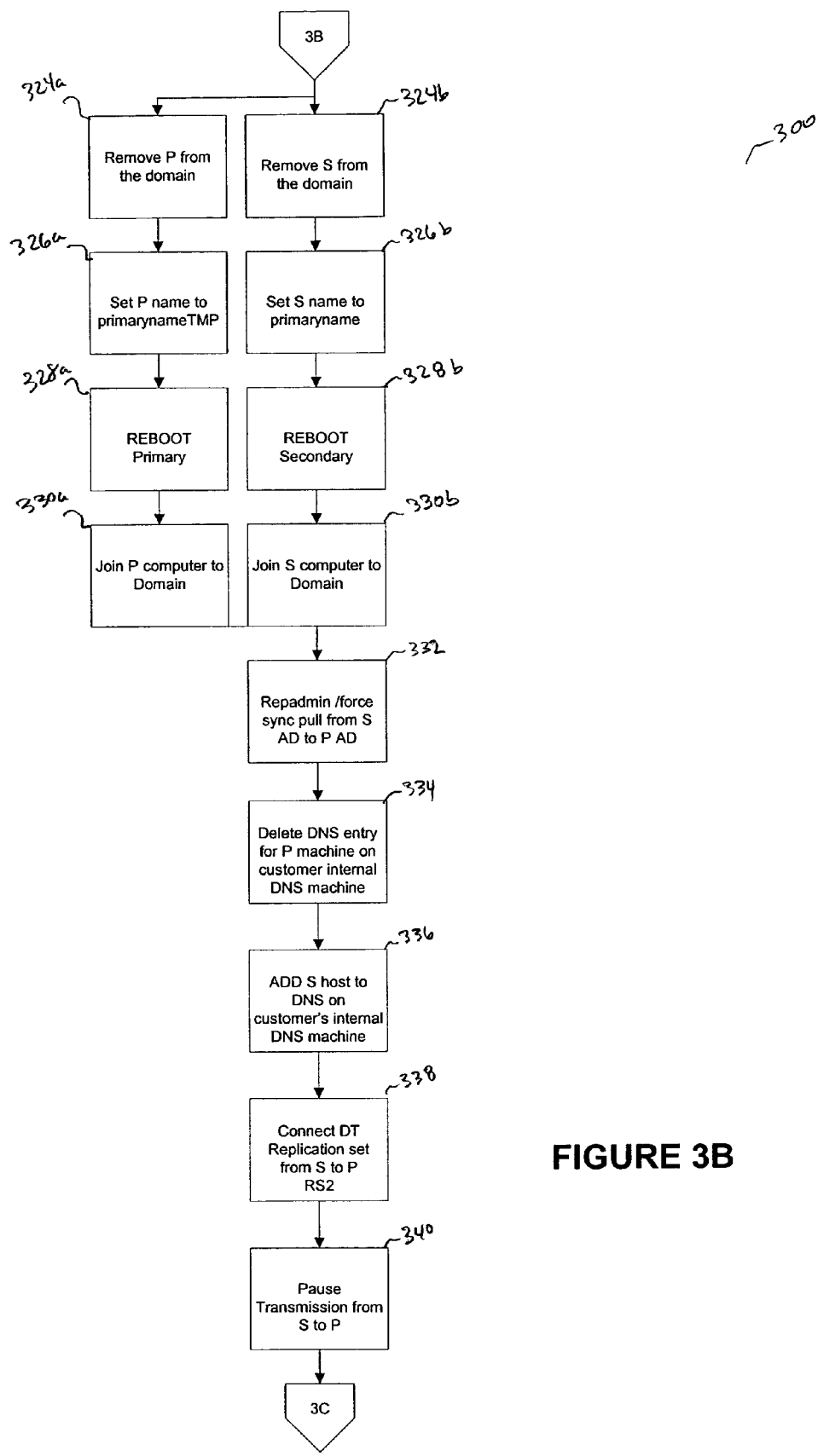
Figure 3C:
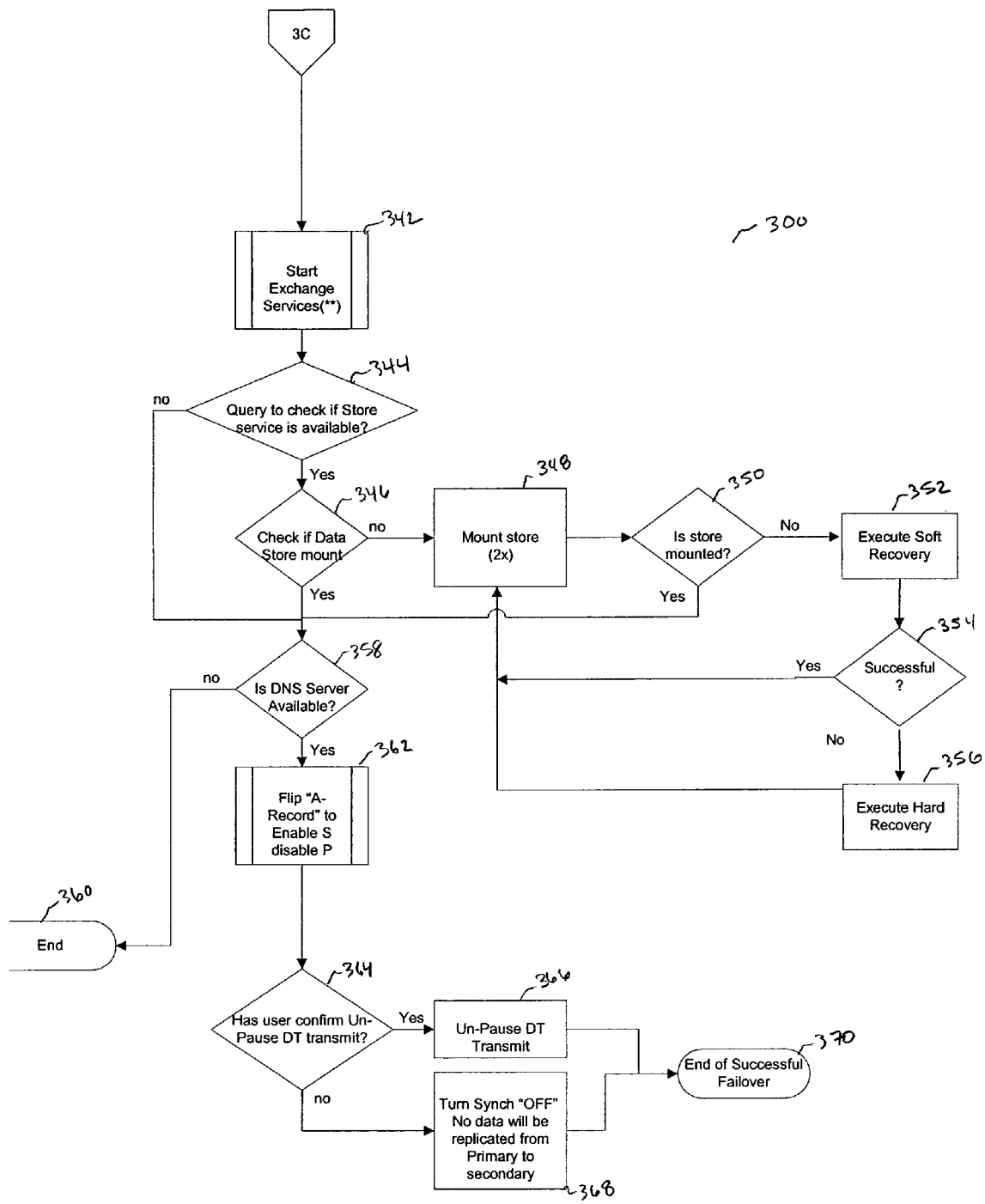

Referring to FIGS. 3A-3C, block diagrams illustrating a failure switch-over process 300 (i.e., transition from primary environment 102 to secondary environment 106 under the control of logic executing on server 128) according to an embodiment of the present invention are shown. As will be apparent to those skilled in the relevant art(s) after reading the description herein, failure switch-over process 300 illustrates in more detail the occurrences of state transitions 208 and 234 shown in FIG. 2.

In step 302, a user (e.g., network administrator or IT manager) engages failure switch-over process 300 in order to switch from primary (P) Exchange environment 102 to secondary (S) Exchange environment 106 using a single action (e.g., clicking a button or the like) on the GUI on console 122.

In step 304, process 300 determines if primary environment 102 is available. If so, process 300 proceeds to step 306, else to step 314. In an embodiment this determination is made using intelligence gathered by one or more intelligent agents 112a in communications with monitoring and management server module executing on server 128.

In step 306, all configured Exchange database stores 120a (e.g., Mailboxes and Public folders) are dismounted.

In step 308, all configured application services within primary environment 102 are stopped. For example, as will be appreciated by those skilled in the relevant art(s), the following services on server 118a are stopped for Exchange: POP3, IMAP4, MSMTA, MSIS, MSRESVC, MSSA, WWW and IIS Admin.

In step 310, synchronization of data between primary environment 102 and secondary environment 106 is paused and all remaining data changes in the replication queue are sent to secondary environment 106 such that information store 120b and associated Exchange transaction logs will reflect identical data stored in information store 120a. In one embodiment, this is accomplished utilizing the Double-Take® replication engine software product (shown as "DT" in the figures).

In step 312, data synchronization is completed and a replicated data set (RS1) is now available on information store 120b. In the embodiment where the Double-Take® software application is utilized for synchronization, the application on source server 118a is disconnected from the application on target server 118b.

In step 314, in an embodiment, process 300 waits for the user to confirm that they wish to continue with the failure switch-over procedure. In step 316, process 300 determines if the user does confirm the failure switch-over procedure. If the user decides to abort, process 300 proceeds to step 318 where process 300 is aborted. Thus, the services would be restored/reverted back to primary environment 102, if available, otherwise an alert (e.g., an e-mail) would be sent to a site 102 contact person and the service provider organization). If the determination of step 316 is positive, or if the confirmation interval times out (e.g., after ten seconds), process 300 proceeds to step 320.

In step 320, the determination first made in step 304 is repeated before process 300 proceeds any further.

In step 322, the hostname of primary Exchange server 118a is removed from the enterprise's Active Directory domain on servers 116a-b.

In steps 324a-b, the hostname of primary Exchange server 118a and secondary Exchange server 118b are removed from the Active Directory domain on servers 116a-b, respectively.

In steps 326a-b, the hostname of Exchange server 118a is set to new name (e.g., by appending a unique string to the original name, such as "<primaryName>+<'tmp'>") and the hostname of secondary Exchange server 118b is set to the original hostname of the primary Exchange server 118a, respectively.

In steps 328a-b, primary Exchange server 118a and secondary Exchange server 118b are rebooted, respectively. Further, in steps 330a-b, the new hostnames of primary Exchange server 118a and secondary Exchange server 118a are joined to the domain, respectively.

(As will be appreciated by those skilled in the relevant art(s) after reading the description herein, in the event primary environment 102 no longer exists (e.g., due to a disaster), then steps 324a-330a are bypassed.)

In step 332, process 300 executes a command on server 116b to force replication of all new Active Directory records between Active Directory servers 116a-b.

In step 334, the original hostname (and IP address) of primary Exchange server 118a is deleted from the DNS on server 116a for primary environment 102. Then, in step 336, the new temporary hostname (and IP address) of Exchange server 118a is added to the DNS server 116a; and the new temporary hostname (and IP address) of Exchange server 118b is added to the DNS server 116b.

In step 338, a replication session (which captured data is designated as data set RS2) is initiated from secondary environment 106 to primary environment 102.

In step 340, data transmission from secondary Exchange environment 118b to primary Exchange environment 118a is paused.

In step 342, Exchange services on secondary Exchange server 118b are started (e.g., as will be appreciated by those skilled in the relevant art(s), IIS Admin, NNTP, WWW, SMTP, SA, RE, MSIS, MTA, IMAP and POP3 services are started).

In step 344, process 300 determines if the MSIS process, initiated in step 380, has actually started executing. If so, process 300 proceeds to step 346. Otherwise, process 300 proceeds to step 350.

In step 346, process 300 determines if data stores 120b are mounted (e.g., Mailboxes and Public folders). If the determination of step 346 is positive, process 300 proceeds to step 358. Otherwise, process 300 proceeds to 348.

In step 348, at least two attempts are made to mount store 120b. Then, in step 350, process 300 determines if stores 120b have actually been mounted. If so, process 300 returns to step 344. Otherwise, process 300 proceeds to step 352 where a soft recovery utility is executed against information store 120b. If step 352 is not successful (as determined by step 354), process 300 proceeds to step 356 where a hard recovery is executed against information store 120b. In either case, process 300 returns to step 348.

In step 358, process 300 determines if DNS servers 136a-b are available. If not, process 300 ends and the failure switch-over process has failed as indicated by step 360. If so, in step 362 the records on DNS server 136 are modified such that the MX record for the enterprise's mail server and any other records for Web mail access are changed to reflect the IP address(es) of the servers within secondary site 106. As will be appreciated by those skilled in the relevant art(s), DNS servers 136a-b must be assigned as an authoritative DNS for these records, and the DNS "time to live" (TTL) for these records must be set to zero in order to ensure automatic redirection of incoming e-mail and of Exchange end-users within the 15 minute window for DRMS system 100 fail-over process.

In step 364, process 300 queries whether the user would like to un-pause the replication session initiated in step 340. If so, in step 366, the replication session is un-paused and data synchronization is started from server 118b to 118a. If not, in step 368, data synchronization is turned off and secondary environment 106 will service end users 110 without any data synchronization (i.e., backup) to server 118a. This is to allow for maintenance on primary site 102 prior to any data replication.

Process 300 then ends as indicated by step 370.

As will be apparent to those skilled in the relevant art(s) after reading the description herein, the switch-back process, in an embodiment, follows the identical flow (but from secondary environment 106 to primary environment 102) as failure switch-over process 300 shown in FIGS. 3A-C.

VI. Auto Pilot Operation

In an embodiment of the present invention, the GUI on console 122 also allows a user to set an "Auto Pilot" setting (i.e., enabled/disabled). FIG. 9A illustrates GUI screen 910 (capable of being shown on console 122) which allows a user to enable and disable Auto Pilot (e.g., by using button 912).

When enabled, monitoring and management server module executing on server 128 within site 104a-b can automatically perform failure switch-over process 300 to switch from primary environment 102 to secondary environment 106 without the need for the user to perform the single action (e.g., clicking a button or the like) on the GUI on console 122 (i.e., this results in a "zero-action" failure switch-over). In one embodiment, associated user settings can further control the Auto Pilot setting (e.g., setting a pre-determined wait time for performing failure switch-over after detecting an application is unavailable). FIG. 9D illustrates GUI screen 940 (capable of being shown on console 122) which allows a user to change and customize Auto Pilot-related settings according to an embodiment of the present invention.

Figure 4:
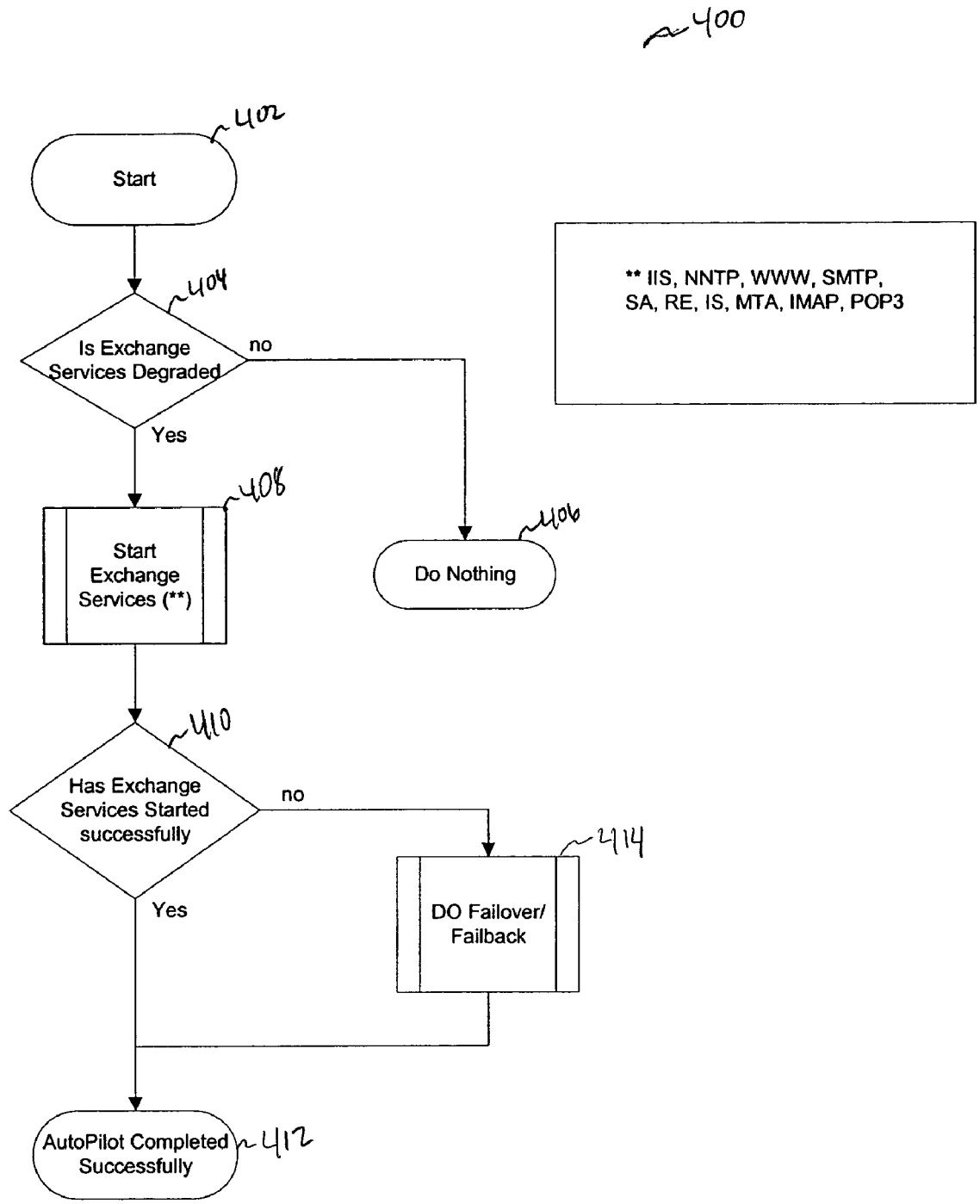

Referring to FIG. 4, a block diagram illustrating an auto pilot process 400 according to an embodiment of the present invention is shown. Process 400 begins at step 402 with control passing immediately to step 404.

In step 404, process 400 determines if the Exchange service within site 102 is experiencing degraded performance (or if server 118a is unavailable). This is accomplished, in an embodiment, by distributed intelligent agents 112a which constantly check the health of the Exchange environment. In turn, this allows monitoring and management server module executing on server 128 to render a state indicative of the "health" of site 102. If the determination of step 404 is negative, process 400 does nothing as indicated by step 406. (As will be appreciated by those skilled in the relevant art(s) after reading the description herein, process 400, in an embodiment, executes in a loop constantly monitoring site 102.)

In step 408, when the determination of step 404 is positive, process 300 attempts to (re)start Exchange application services on server 118a. The success of step 408 is tested in step

410. If successful, process 400 ends as indicated by step 412. Otherwise, process 400 proceeds to step 414 where the failure switch-over process (i.e., process 300) is initiated. Process 400 then ends as indicated by step 412.

As will be apparent to those skilled in the relevant art(s) after reading the description herein, process 400 can also be used to automatically initiate the switch-back process.

VII. Auto-Synch Operation

In an embodiment of the present invention, the GUI on console 122 also allows a user to set an "AutoSync" setting (i.e., enabled/disabled). FIG. 9A illustrates an example GUI screen 910 (capable of being shown on console 122) which allows a user to enable and disable AutoSync (e.g., by using button 914).

When AutoSync is enabled, system 100 will ensure the safe and timely transmission of data from the active Exchange server 118 to the passive Exchange server 118. If degradation in the quality of transmission is detected, an AutoSync process automatically attempts to analyze and remedy the degraded connection.

When AutoSync is disabled, system 100 will ensure that no data will be replicated from the active Exchange server 118 to the passive Exchange server 118. The AutoSync process monitors for replication state change and ensures that no data is transmitted during this time.

Figure 5:
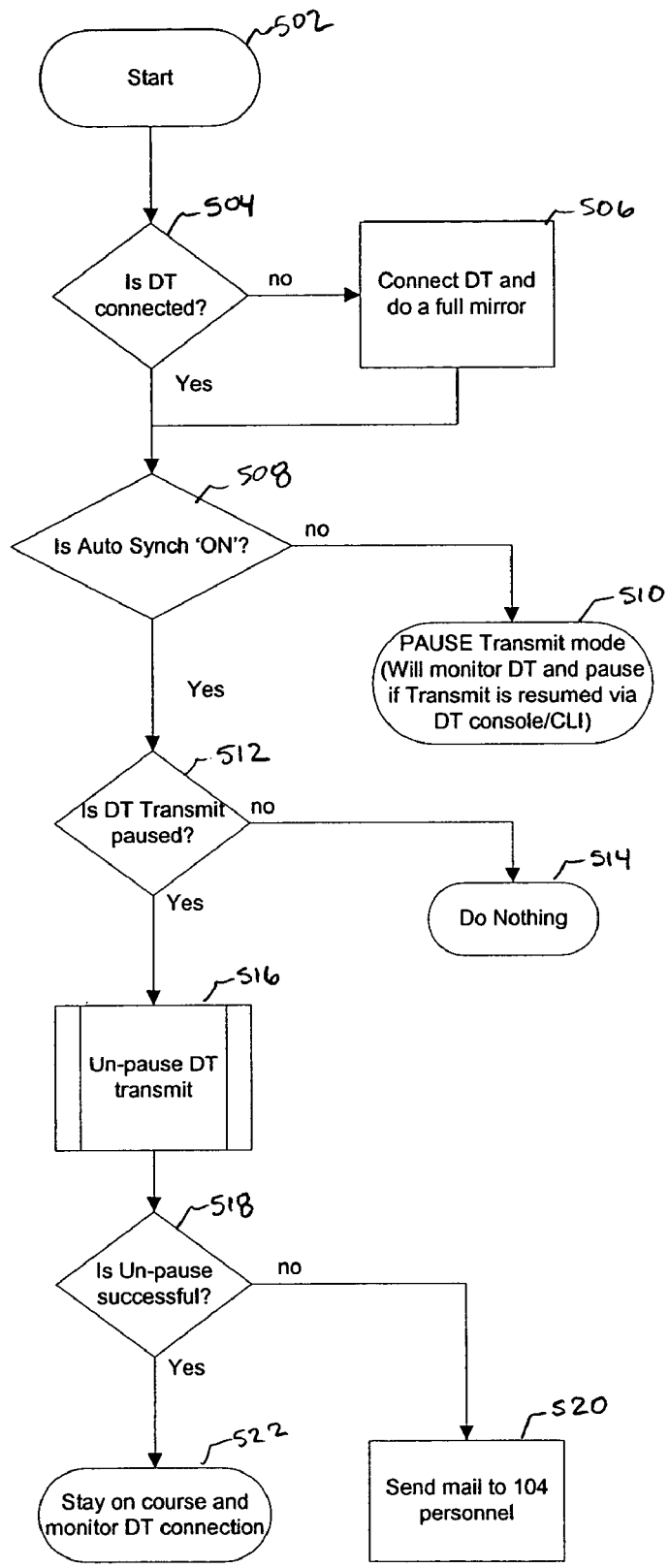

Referring to FIG. 5, a block diagram illustrating an Auto-Sync process 500 according to an embodiment of the present invention is shown. Process 500 begins at step 502 with control passing immediately to step 504.

In step 504, monitoring and management server module executing on server 128 determines if a replication session has been established and connected between active Exchange server 118 to the passive Exchange server 118 by the synchronization software (e.g., the Double-Take® software product). If not, process 500 proceeds to step 506. Otherwise, process 500 proceeds to step 508.

In step 506, a replication session is established and connected between the active and passive Exchange servers 118 and a "full mirror" is performed. That is, for every byte in the replication set (RS1), a difference check is done such that any delta between the data sets of Exchange-related data between Exchange servers 118a-b and stores 120a-b are sent from the source to the target.

In step 508, process 500 determines if AutoSync is enabled. If not, transmissions from the source to the target are paused in step 510. In an embodiment, process 500 remains in this state until transmissions from the source to the target are un-paused either via the GUI on console 122.

In step 512, when the determination of step 508 is positive, process 500 determines if the synchronization software is paused. If not, process 500 ends as indicated by step 514. If so, process 500 proceeds to step 516 where the synchronization software is un-paused.

In step 518, process 500 determines if the un-pausing of the synchronization software was successful. If so, process 500 continues to monitor the synchronization connection as indicated by step 522. If not, in step 520, process 500 causes an alert (e.g., an e-mail) to be sent to the service provider's personnel at control center 104 informing them that resumption of data synchronization has failed.

VIII. Archive Operation

In an embodiment of the present invention, the GUI on console 122 also allows a user to set an "Archive" setting (i.e., enabled/disabled).

When Archive is enabled, system 100 will take snapshots of, and age appropriately, Exchange data during the intervals as specified by the customer in an Archive preferences section of the GUI on console 122. Such point-in-time snapshots serve as "multi-level," near-line physical archival storage 124a-n (e.g., 24, 48 and 72 hour levels of archival data). In one embodiment, associated user settings can further control the archive setting (e.g., setting a one or more pre-determined archival "levels" for scheduling the archives). FIG. 9E illustrates an example GUI screen 950 (capable of being shown on console 122) which allows a user to set system 100 preferences with respect to the Archive setting.

When Archive is disabled, however, system 100 will not take such snapshots of Exchange data for the duration of this condition.

Figure 6:
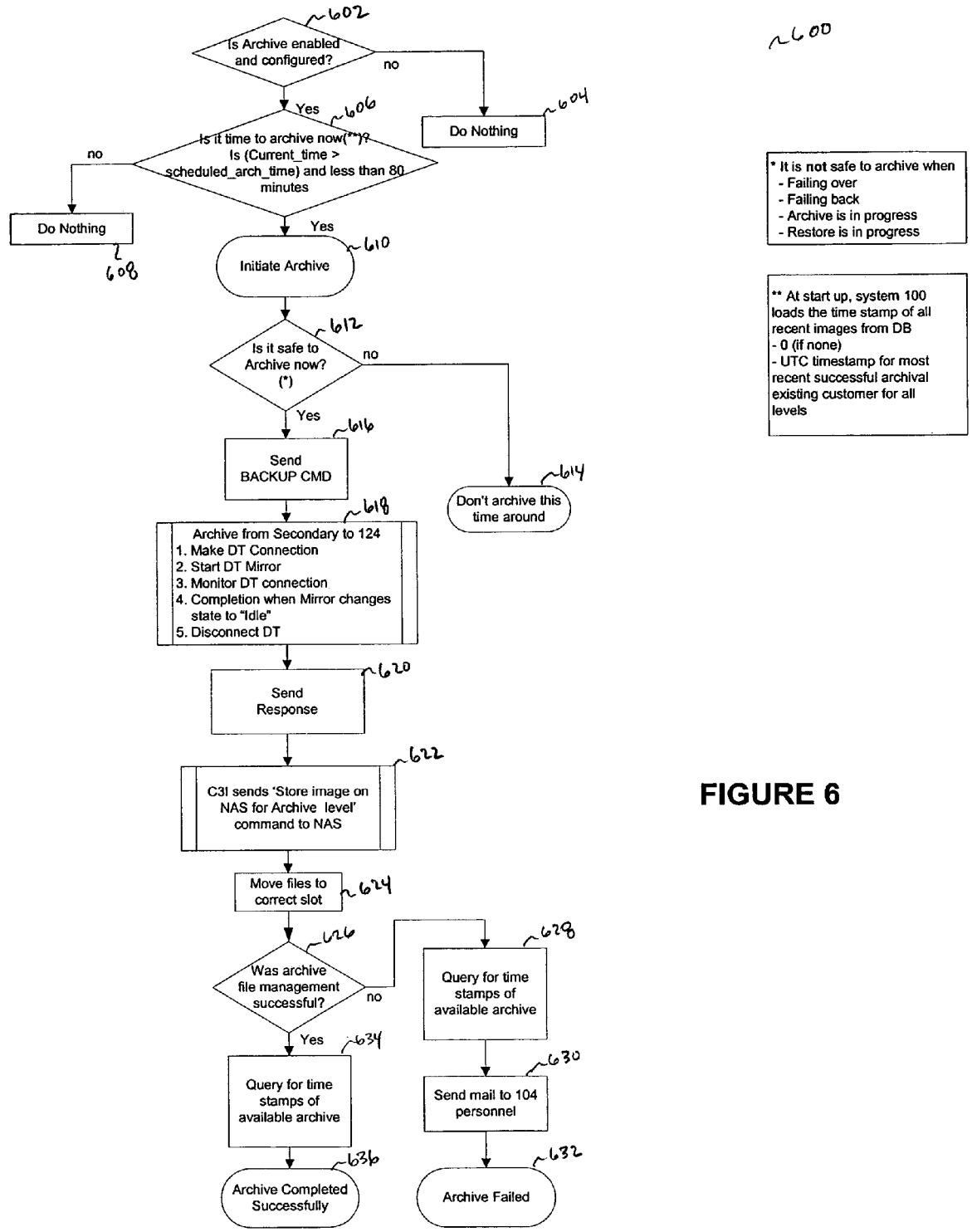

Referring to FIG. 6, a block diagram illustrating an archival process 600 according to an embodiment of the present invention is shown. Process 600 begins at step 602 where it is determined if the Archive setting has been enabled. If not, process 600 ends as indicated by step 604. Otherwise, the Archive setting has been enabled and process 600 proceeds to step 606.

In step 606, process 600 determines if it is time to perform an archive based on the user "level" settings. If not, process 600 ends as indicated by step 608. (As will be appreciated by those skilled in the relevant art(s) after reading the description herein, process 600, in an embodiment, executes in a loop.) In step 610, when the determination of step 608 is positive, the archival process is initiated.

In step 612, process 600 determines if it is safe to continue. In an embodiment, the determination of step 612 will be negative if a restore process 700 is in progress, another archive process 600 is in progress, or a failure switch-over/switch-back process 300 is in progress. Thus, process 600 would proceed to step 614 and the present archive process 600 would terminate.

If the determination of step 612 is positive, in step 616 a backup command is sent by the monitoring and management server module executing on server 128 to intelligent agent 112b on server 118b. This causes, in step 618, data to be from information store 120b to be stored onto data archives 124.

In step 620, a response is received by the monitoring and management server module executing on server 128 from intelligent agent 112b on server 118b indicating that step 618 is completed.

In step 622, the monitoring and management server module executing on server 128 sends a command to the storage disks 124a-n to archive the recently-stored data. Then, in step 624, the recently-stored data is placed in the appropriate "level" (i.e., stored in the appropriate disks 124a-n based on archive level of, for example, 24, 48 or 72 hour archive). In step 626, process 600 determines if step 624 was successful. If not, process 600 obtains a Universal Time Coordinated (UTC) time stamp (step 628), sends an alert (e.g., an e-mail) to the service provider's personnel at control center 104 (step 630) and ends as indicated by step 632. Otherwise, process 600 proceeds to step 634.

In step 634, when the determination of step 626 is positive, process 600 obtains a time stamp to associate with the successful archive operation and ends as indicated by step 636.

IX. Restore Operation

In an embodiment of the present invention, the GUI on console 122 also allows a user to initiate a "Restore" operation. Once the user selects to perform a "Restore" operation, they will be presented with an option to restore one or more images (i.e., image choices corresponding to the "levels" of archival data configured and stored in archives 124a-n). FIG. 9E illustrates an example GUI screen 952 (capable of being shown on console 122) which allows a user to select a restore image once the restore operation has been initiated.

In an embodiment, once a restore operation is initiated, system 100 uncompresses (as appropriate) and copies the selected image from the appropriate disks 124*a-n* to store 120*b* of the secondary Exchange server 118*b*. System 100 will then initiate an automated failure switch-over process 300 which allows the data from secondary store 120*b* to be replicated to primary store 120*a* via the normal data synchronization process described above.

Figure 7:
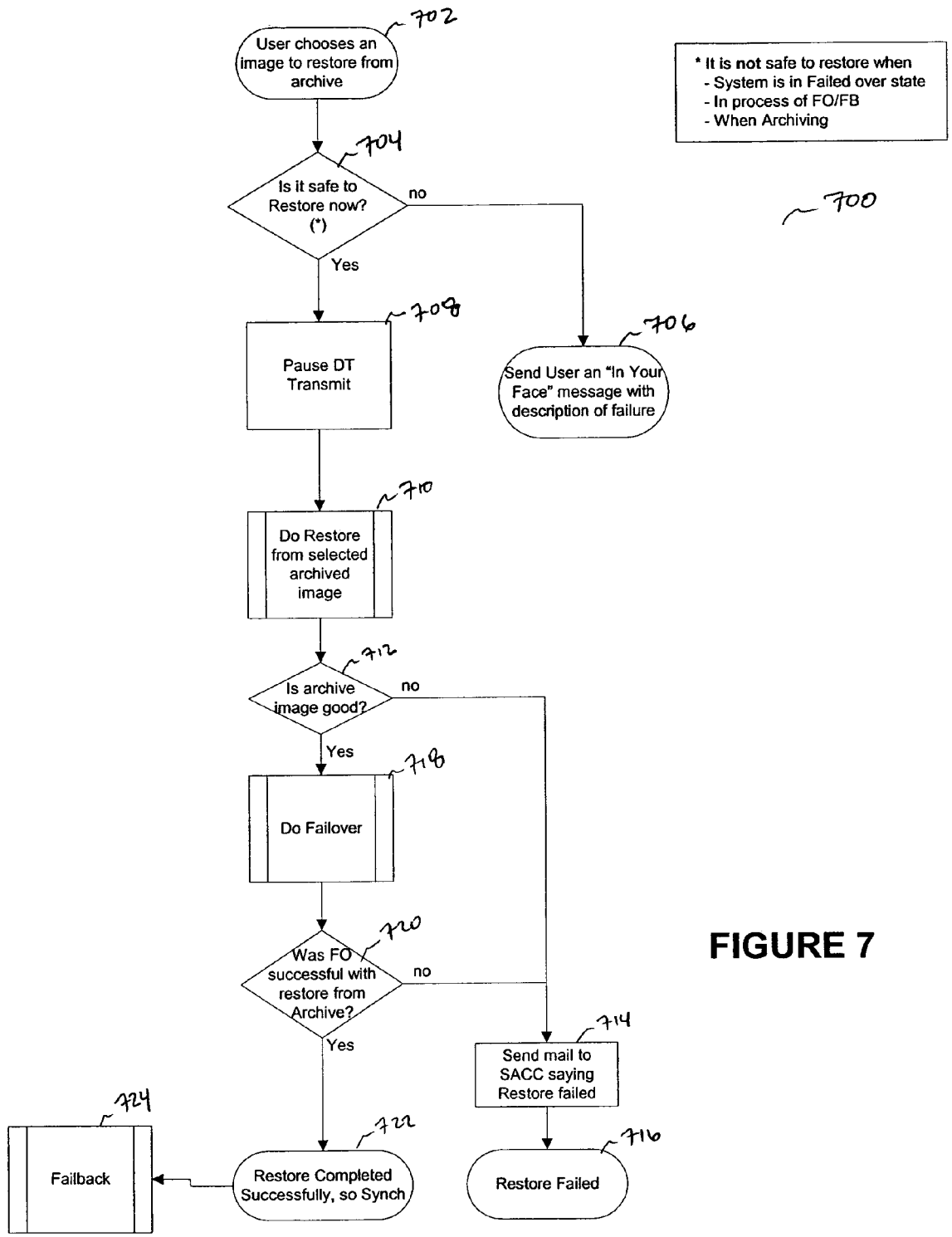

Referring to FIG. 7, a block diagram illustrating an restore process 700 according to an embodiment of the present invention is shown.

In step 702, a user chooses to initiate the restore operation (e.g., clicking a button or the like) on the GUI on console 122.

In step 704, process 700 determines if it is safe to continue. In an embodiment, the determination of step 704 will be negative if a an archive process 600 is in progress, a failure switch-over/switch-back process 300 is in progress or if the secondary Exchange Server 118*b* is currently the active server. Thus, process 700 would proceed to step 706 where an alert (e.g., a pop-up message) is sent to the user informing them that the restore operation failed and process 700 would terminate.

If the determination of step 704 is positive, data synchronization from store 120*a* to 120*b* is paused in step 708. Then, in step 710, process 700 uncompresses (if and as appropriate) and copies the selected image from the appropriate disk 124*a-n* to store 120*b*.

In step 712, process 700 determines if step 710 was successful (i.e., is the restored image now residing on store 120*b* a good image). If not, in step 714, an alert (e.g., an e-mail) is sent to the service provider's personnel at control center 104 informing them that the restore operation has failed. Process 700 would then end as indicated by step 716.

If the determination of step 712 is positive, failure switch-over 300 is performed in step 718. Then in step 720, process 700 determines if step 718 was successful. If so, the data from the restored image is replicated from secondary store 120*b* to primary store 120*a* in step 722 via the normal data synchronization process. Then in step 724, a switch-back process 300 is performed and process 700 would then end.

If the determination of step 720 is negative, process 700 proceeds to steps 714-716 as described above.

X. Example Implementations

The present invention (DRM system 100, processes 200-700 or any part(s) or function(s) thereof) may be implemented using hardware, software or a combination thereof and maybe implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 8:
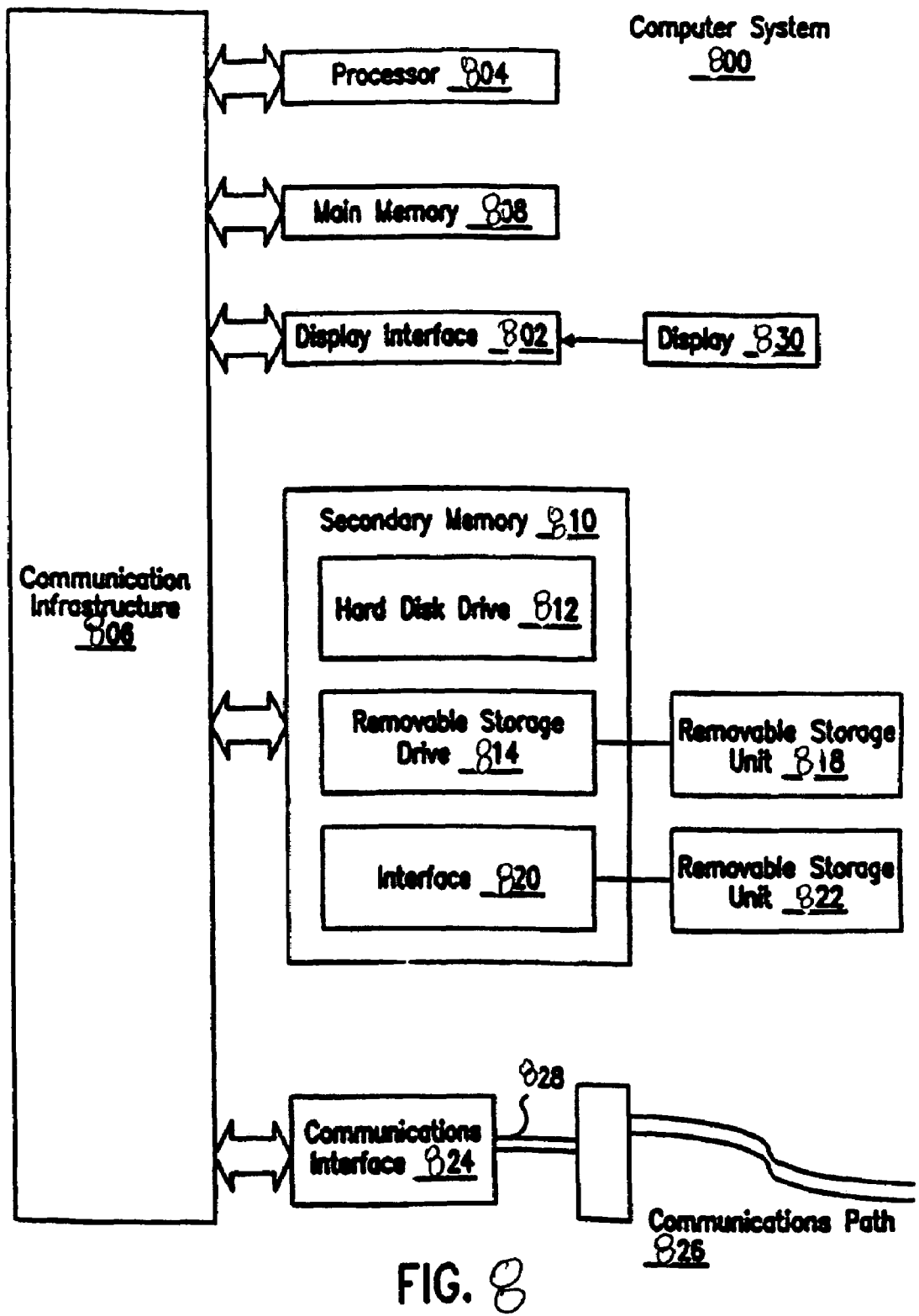
FIG. 8 is a block diagram of an exemplary computer system useful for implementing the present invention.

In fact, in one embodiment, the invention is directed toward one or more computer systems capable of carrying out the functionality described herein. An example of a computer system 800 is shown in FIG. 8.

The computer system 800 includes one or more processors, such as processor 804. The processor 804 is connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and maybe implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. The invention is directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

XI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures and screen shots illustrated in the attachments, which highlight the functionality and advantages of system 100, are presented for example purposes only. The architecture of the present invention is sufficiently flexible and configurable, such that it may be utilized (and navigated) in ways other than that shown in the accompanying Figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for providing a user with an application monitoring and disaster recovery management tool, comprising the steps of:

deploying a first plurality of intelligent agents within a primary computing environment, said primary computing environment including a primary server executing an application, and wherein each of said first plurality of intelligent agents monitors a metric related to said application;

monitoring, by a monitoring and management server module executing on a management server, a plurality of states, each of said plurality of states being rendered by one of said first plurality of intelligent agents, wherein said management server is in communication with said primary computing environment and a secondary computing environment;

displaying to a user, via a graphical user interface in communications with said monitoring and management server module, said plurality of states; and performing a failure switch-over from said primary computing environment to a secondary computing environment having a secondary server capable of executing said application in response to a first input received from said user via said graphical interface, wherein said first input is received by said monitoring and management server module as a result of a button click by the user on said graphical user interface;

whereby said method allows for disaster recovery and fault tolerance, and limits computing down-time experienced by end users of said primary computing environment.

2. A method for providing a user with an application monitoring and disaster recovery management tool, comprising the steps of:

deploying a first plurality of intelligent agents within a primary computing environment, said primary computing environment including a primary server executing an application, and wherein each of said first plurality of intelligent agents monitors a metric related to said application;

monitoring, by a monitoring and management server module executing on a management server, a plurality of states, each of said plurality of states being rendered by one of said first plurality of intelligent agents, wherein said management server is in communication with said primary computing environment and a secondary computing environment;

displaying to the user, via a graphical user interface in communications with said monitoring and management server module, said plurality of states; and performing a failure switch-over from said primary computing environment to a secondary computing environment having a secondary server capable of executing said application in response to a first input received from the user via said graphical interface;

performing a switch-back from said secondary computing environment to said primary computing environment in response to a second input received from the user via said graphical interface, wherein said second input is received by said monitoring and management server module and as a result of a button click by the user on said graphical user interface;

whereby said method allows for disaster recovery and fault tolerance, and limits computing down-time experienced by end users of said primary computing environment.

3. An article of manufacture for providing a user with an application monitoring and disaster recovery management tool, the article of manufacture comprising:

a computer usable storage medium; and processor instructions stored on said computer usable storage medium for causing a computer to:

deploy a plurality of intelligent agents within a primary computing environment, said primary computing environment including a primary server executing an application, and wherein each of said plurality of intelligent agents monitors a metric related to said application;

monitor a plurality of states, each of said plurality of states being rendered by one of said plurality of intelligent agents;

display to the user, via a graphical user interface, said plurality of states; and perform a failure switch-over from said primary computing environment to a secondary computing environment having a secondary server capable of executing said application in response to a single action input received from the user via said graphical user interface, wherein said single action is a button click by the user on said graphical user interface.

4. The article of manufacture of claim 3, wherein said application is an electronic mail application, and further comprising:
    processor instructions for causing the computer to temporarily change the hostname of said secondary server to the hostname of said primary server.

5. The article of manufacture of claim 3, wherein said the processor instructions for causing the computer to deploy a plurality of intelligent agents comprises:
    processor instructions for causing the computer to query said application once every pre-determined time period in order for each said plurality of intelligent agents to monitor said corresponding metric related to said application.

* * * * *

UNITED STATES PATENT AND TRADEMARK OFFICE
CERTIFICATE OF CORRECTION

PATENT NO. : 7,426,652 B2  
APPLICATION NO. : 10/657561  
DATED : September 16, 2008  
INVENTOR(S) : Liccione et al.

Page 1 of 1

It is certified that error appears in the above-identified patent and that said Letters Patent is hereby corrected as shown below:

Claim 1: Col. 17, line 60: add "of said application" after "states".

Claim 1: Col. 18, line 1: add "of said application" after "switchover".

Claim 2: Col. 18, line 31: delete "and" after "states;".

Claim 2: Col. 18, line 32: add "of said application" after "switchover".

Claim 2: Col. 18, line 36: add "and" after "interface;".

Claim 2: Col. 18, line 37: add "of said application" after "switch-back".

Claim 3: Col. 18, line 59: add "of said application" after "states". (First occurrence)

Claim 3: Col. 18, line 64: add "of said application" after "switch-over".

Signed and Sealed this

Thirty-first Day of March, 2009

JOHN DOLL  
*Acting Director of the United States Patent and Trademark Office*